(12) United States Patent
Pakula et al.

(10) Patent No.: US 10,996,713 B2
(45) Date of Patent: May 4, 2021

(54) PORTABLE ELECTRONIC DEVICE

(71) Applicant: Apple Inc., Cupertino, CA (US)

(72) Inventors: David A. Pakula, San Francisco, CA (US); Daniel W. Jarvis, Sunnyvale, CA (US); Shimon Elkayam, San Jose, CA (US); Brandon R. Garbus, Santa Clara, CA (US); Christopher S. Graham, San Francisco, CA (US); Karl Ruben F. Larsson, Los Altos, CA (US); Ashley E. Fletcher, Sunnyvale, CA (US); Jared M. Kole, San Jose, CA (US); Eric S. Jol, San Jose, CA (US); Aaron A. Oro, Palo Alto, CA (US); Michael D. Quinones, Campbell, CA (US); Gregory N. Stephens, Sunnyvale, CA (US); Ian A. Spraggs, San Francisco, CA (US); James A. Bertin, San Jose, CA (US); Simon C. Helmore, San Francisco, CA (US); Melissa A. Wah, San Jose, CA (US); Matthew D. Hill, Santa Clara, CA (US); Jon F. Housour, Cupertino, CA (US); Douglas G. Fournier, San Jose, CA (US); Christopher S. Tomasetta, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/056,306

(22) Filed: Aug. 6, 2018

(65) Prior Publication Data

US 2019/0041909 A1 Feb. 7, 2019

Related U.S. Application Data

(60) Provisional application No. 62/557,035, filed on Sep. 11, 2017, provisional application No. 62/556,190, (Continued)

(51) Int. Cl.
*G06F 1/16* (2006.01)
*H04N 5/225* (2006.01)
(Continued)

(52) U.S. Cl.
CPC .......... *G06F 1/1626* (2013.01); *G06F 1/1658* (2013.01); *G06F 1/1686* (2013.01);
(Continued)

(58) Field of Classification Search
None
See application file for complete search history.

(56) References Cited

U.S. PATENT DOCUMENTS 7,683,962 B2 3/2010 Border et al.
7,859,588 B2 12/2010 Parulski et al.
(Continued)

FOREIGN PATENT DOCUMENTS

CN 102131357 A 7/2011
CN 102573277 A 7/2012
(Continued)

OTHER PUBLICATIONS

PCT Patent Application No. PCT/US2018/040648—International Search Report and Written Opinion dated Nov. 16, 2018.
(Continued)

*Primary Examiner* — Duane N Taylor, Jr.
(74) *Attorney, Agent, or Firm* — Dickinson Wright RLLP

(57) ABSTRACT

An electronic disclosed herein may include a band formed from metal that combines with a bottom wall formed from a non-metal to form an enclosure that carries internal components. The electronic device may include a transparent cover and a display assembly partially covered by a border having a uniform dimension. The electronic device may include a vision system designed for facial recognition of a user of the electronic device. A bracket assembly may
(Continued)

hold the vision system. The bracket assembly may not be affixed to the enclosure and may move relative to the enclosure. The electronic device may include a battery assembly having multiple battery components coupled together. The electronic device may further include a receiver coil for wireless charging of the battery assembly. The electronic device may include a circuit board assembly having stacked circuit boards. The electronic device may further include a dual camera assembly.

8 Claims, 20 Drawing Sheets

Related U.S. Application Data filed on Sep. 8, 2017, provisional application No. 62/542,210, filed on Aug. 7, 2017, provisional application No. 62/542,280, filed on Aug. 7, 2017, provisional application No. 62/542,206, filed on Aug. 7, 2017, provisional application No. 62/542,277, filed on Aug. 7, 2017.

(51) Int. Cl.
*H02J 50/10* (2016.01)
*H04M 1/02* (2006.01)
*H02J 50/70* (2016.01)
*G06F 1/26* (2006.01)
*G06K 9/00* (2006.01)

(52) U.S. Cl.
CPC ............... *G06F 1/26* (2013.01); *H02J 50/10* (2016.02); *H02J 50/70* (2016.02); *H04M 1/0202* (2013.01); *H04N 5/2252* (2013.01); *H04N 5/2258* (2013.01); *G06K 9/00288* (2013.01); *H04M 1/0264* (2013.01); *H04M 1/0277* (2013.01)

(56) References Cited

U.S. PATENT DOCUMENTS

| | | | |
|---|---|---|---|
| 8,180,112 B2 | 5/2012 | Kurtz et al. | |
| 8,261,090 B1 | 9/2012 | Matsuoka | |
| 8,719,584 B2* | 5/2014 | Mullin | G06F 1/1626 713/182 |
| 8,788,977 B2 | 7/2014 | Bezos | |
| 9,019,428 B2 | 4/2015 | Shukla et al. | |
| 9,469,469 B2 | 10/2016 | Rayner | |
| 9,513,664 B2 | 12/2016 | Werner et al. | |
| 9,639,935 B1 | 5/2017 | Douady-Pleven et al. | |
| 9,718,249 B2 | 8/2017 | Kwong | |
| 9,997,036 B2 | 6/2018 | Scalisi | |
| 10,268,234 B2 | 4/2019 | Fletcher et al. | |
| 2005/0275748 A1 | 12/2005 | Takekuma et al. | |
| 2007/0009139 A1 | 1/2007 | Landschaft et al. | |
| 2009/0041309 A1 | 2/2009 | Kim et al. | |
| 2011/0255000 A1 | 10/2011 | Weber et al. | |
| 2012/0081282 A1 | 4/2012 | Chin | |
| 2012/0088558 A1 | 4/2012 | Song | |
| 2012/0250950 A1 | 10/2012 | Papakipos et al. | |
| 2013/0033581 A1 | 2/2013 | Woo et al. | |
| 2013/0162894 A1 | 6/2013 | Lee | |
| 2014/0028902 A1 | 1/2014 | Sanford et al. | |
| 2014/0063265 A1 | 3/2014 | Shukla et al. | |
| 2014/0313430 A1 | 10/2014 | Bui et al. | |
| 2015/0002734 A1 | 1/2015 | Lee | |
| 2015/0022620 A1 | 1/2015 | Siminoff | |
| 2015/0044816 A1 | 2/2015 | Kim et al. | |
| 2015/0049191 A1 | 2/2015 | Scalisi et al. | |
| 2015/0198864 A1 | 7/2015 | Havskjold et al. | |
| 2015/0311011 A1 | 10/2015 | Lynch et al. | |
| 2016/0028931 A1 | 1/2016 | Kwong et al. | |
| 2016/0061653 A1 | 3/2016 | Chang et al. | |
| 2016/0191769 A1 | 6/2016 | Yeh et al. | |
| 2016/0329628 A1 | 11/2016 | Kim et al. | |
| 2017/0013738 A1 | 1/2017 | Jarvis et al. | |
| 2017/0026585 A1 | 1/2017 | Shaw et al. | |
| 2017/0085764 A1* | 3/2017 | Kim | H04N 5/2258 |
| 2017/0094222 A1 | 3/2017 | Tangeland et al. | |
| 2017/0104901 A1 | 4/2017 | Sanford et al. | |
| 2017/0141458 A1* | 5/2017 | Kwon | G06F 1/1626 |
| 2017/0149944 A1 | 5/2017 | Louch | |
| 2017/0188014 A1 | 6/2017 | Woo et al. | |
| 2017/0288298 A1* | 10/2017 | Kim | H04B 1/3818 |
| 2017/0289324 A1 | 10/2017 | Yeo et al. | |
| 2018/0032163 A1* | 2/2018 | Park | B43K 24/02 |
| 2018/0090974 A1 | 3/2018 | Elkayam et al. | |
| 2018/0267666 A1* | 9/2018 | Park | G06F 3/0412 |
| 2019/0082083 A1 | 3/2019 | Jarvis et al. | |
| 2019/0121396 A1* | 4/2019 | Ha | H01Q 1/243 |
| 2019/0303640 A1* | 10/2019 | Song | G06K 9/0004 |

FOREIGN PATENT DOCUMENTS

| | | |
|---|---|---|
| CN | 202394156 U | 8/2012 |
| CN | 103681737 A | 3/2014 |
| CN | 203573022 U | 4/2014 |
| CN | 103906384 A | 7/2014 |
| CN | 104220389 A | 12/2014 |
| CN | 102187297 B | 3/2015 |
| CN | 104838352 A | 8/2015 |
| CN | 204644191 U | 9/2015 |
| CN | 106561072 A | 4/2017 |
| CN | 106603765 A | 4/2017 |
| CN | 106603776 A | 4/2017 |
| CN | 106605353 A | 4/2017 |
| CN | 106713898 A | 5/2017 |
| CN | 206179425 U | 5/2017 |
| CN | 206302171 U | 7/2017 |
| CN | 107124537 A | 9/2017 |
| DE | 102015215841 B4 | 6/2017 |
| EP | 2916527 B1 | 8/2016 |
| EP | 3171129 A1 | 5/2017 |
| EP | 3340585 A1 | 6/2018 |
| GB | 2552090 A | 1/2018 |
| KR | 1020050029288 A | 3/2005 |
| KR | 10-0757448 B1 | 9/2007 |
| KR | 1020140117491 A | 10/2014 |
| KR | 1020170048064 A | 5/2017 |
| KR | 1020170084444 A | 7/2017 |
| KR | 1020170096453 A | 8/2017 |
| TW | I567527 B | 1/2017 |
| WO | 2010027565 A2 | 3/2010 |
| WO | 2012106216 A3 | 11/2012 |
| WO | 2014088469 A1 | 6/2014 |
| WO | 2014125743 A1 | 8/2014 |
| WO | 2017179445 A1 | 10/2017 |

OTHER PUBLICATIONS

PCT Patent Application No. PCT/US2018/040758—International Search Report and Written Opinion dated Nov. 16, 2018.
European Patent Application 18186752.4—Partial European Search Report dated Dec. 13, 2018.
PCT Patent Application No. PCT/US2018/045657—International Search Report and Written Opinion dated Nov. 30, 2018.
Chris Smith. 'New iPhone 8 schematics leak offers several exciting revelations'. Retrieved from the Internet: <URL: https://bgr.com/2017/04/24/iphone-8-rumors-schematics-leaks></URL:> Apr. 24, 2017.
Chinese Patent for Utility Model No. ZL201820137753.0—Utility Model Patent Evaluation Report (UMPER) dated Dec. 20, 2018.
European Patent Application No. 18190208.1—Extended European Search Report dated Jan. 23, 2019.
Chinese Application for Utility Model No. 201821266436.5—Notification of the First Rectification dated Feb. 19, 2019.
Taiwanese Patent Application No. 107127366—Office Action and Search Report dated Feb. 21, 2019.

(56) References Cited

OTHER PUBLICATIONS

Australian Patent Application No. 2018213976—Examination Report No. 1 dated Mar. 18, 2019.
Ekaterina Buravich, "Overview of smartphone Lumigon T3: 100 "horses" in the Ferrari", https://newsworld.co/overview-of-smartphone-lumigon-t3-100-horses-in-the-ferrari/, Sep. 14, 2017, 28 pages.
PCT Patent Application No. PCT/US2018/014784—International Search Report and Written Opinion dated Jun. 7, 2018.
Chinese Patent for Utility Model No. ZL201821266436.5—Utility Model Patent Evaluation Report (UMPER) dated Sep. 18, 2019.
Smith, "New iPhone 8 schematics leak offers several exciting revelations," https://bgr.com/2017/04/24/iphone-8-rumors-schematics-leak/, Apr. 24, 2017.
Chinese Application for Invention No. 201880051087.1—First Office Action dated Sep. 15, 2020.
Korean Patent Application No. 10-2020-7003350—Notice of Preliminary Rejection dated Nov. 14, 2020.

\* cited by examiner

PORTABLE ELECTRONIC DEVICE

CROSS-REFERENCE TO RELATED APPLICATION(S)

This application claims the benefit of priority to i) U.S. Provisional Application No. 62/557,035, filed on Sep. 11, 2017, entitled "PORTABLE ELECTRONIC DEVICE;" ii) U.S. Provisional Application No. 62/542,277, filed on Aug. 7, 2017, entitled "BRACKET ASSEMBLY FOR A MULTI-COMPONENT VISION SYSTEM IN AN ELECTRONIC DEVICE;" iii) U.S. Provisional Application No. 62/542,280, filed on Aug. 7, 2017, entitled "ELECTRONIC DEVICE HAVING A VISION SYSTEM ASSEMBLY HELD BY A SELF-ALIGNING BRACKET ASSEMBLY;" iv) U.S. Provisional Application No. 62/556,190, filed Sep. 8, 2017, entitled "PORTABLE ELECTRONIC DEVICE;" v) U.S. Provisional Application No. 62/542,210, filed Aug. 7, 2017, entitled "ELECTROMAGNETIC SHIELDING FOR WIRELESS POWER TRANSFER SYSTEMS;" and vi) U.S. Provisional Application No. 62/542,206, filed Aug. 7, 2017, entitled "INDUCTIVE MODULE," the disclosure of each is incorporated herein by reference in its entirety.

FIELD

The following description relates to an electronic device. In particular, the following description relates to a portable electronic device (e.g., smartphone) having various features and enhancements.

BACKGROUND

Portable electronic devices are known to include a housing and a cover glass that combines with the housing to enclose components such as a circuit board, a display, and a battery. Also, portable electronic devices are known to communicate over a network server to send and receive information, as well as communicate with a network carrier to send and receive voice communication.

SUMMARY

In one aspect, an electronic device is described. The electronic device may include a housing having a band coupled with a first transparent protective cover and a second transparent protective cover. The band may combine with the first transparent protective cover and the second transparent protective cover to form an internal volume. The electronic device may further include a bracket assembly positioned in the internal volume and lacking an affixation with the housing. The bracket assembly may carry a vision system that provides facial recognition information. The electronic device may further include an alignment module coupled with the first transparent protective cover. The alignment module may be capable of adjusting a position the bracket assembly and the vision system with respect to the housing. The electronic device may further include a display assembly coupled with the first protective cover. The display assembly may include a notch in a location corresponding to the vision system. The electronic device may further include a wireless charging module capable of receiving an inductive charge through the second protective cover and providing electrical energy to a battery located in the internal volume.

In another aspect, an electronic device is described. The electronic device may include a housing that defines an internal volume. The electronic device may further include a bracket assembly positioned in the internal volume. The bracket assembly may include a first bracket and a second bracket coupled with the first bracket. The electronic device may further include a vision system carried by the bracket assembly and capable of providing facial recognition information. The vision system may include a first camera module and a second camera module. The first camera module and the second camera module may be positioned between the first bracket and the second bracket. The electronic device may further include a battery assembly positioned in the internal volume. The battery assembly may include a first battery component and a second battery component coupled with the first battery component. The first battery component and the second battery component may define an L-shape. The electronic device may further include a trim that carries a third camera module, a fourth camera module, and a light emitter between the third camera module and the fourth camera module. The trim may prevent light generated by the light emitter from entering the third camera module and the fourth camera module.

In another aspect, an electronic device is described. The electronic device may include a housing that defines an internal volume. The electronic device may further include a transparent protective cover coupled with the housing. The transparent protective cover may include a single opening. The electronic device may further include a display assembly coupled with the transparent protective cover. The display assembly may include a notch. The electronic device may further include a vision system positioned in the internal volume in a location corresponding to the notch. The vision system may be capable of providing facial recognition information. The electronic device may further include an audio module positioned in the internal volume and aligned with the single opening.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

The disclosure will be readily understood by the following detailed description in conjunction with the accompanying drawings, wherein like reference numerals designate like structural elements, and in which.

Figure 1:
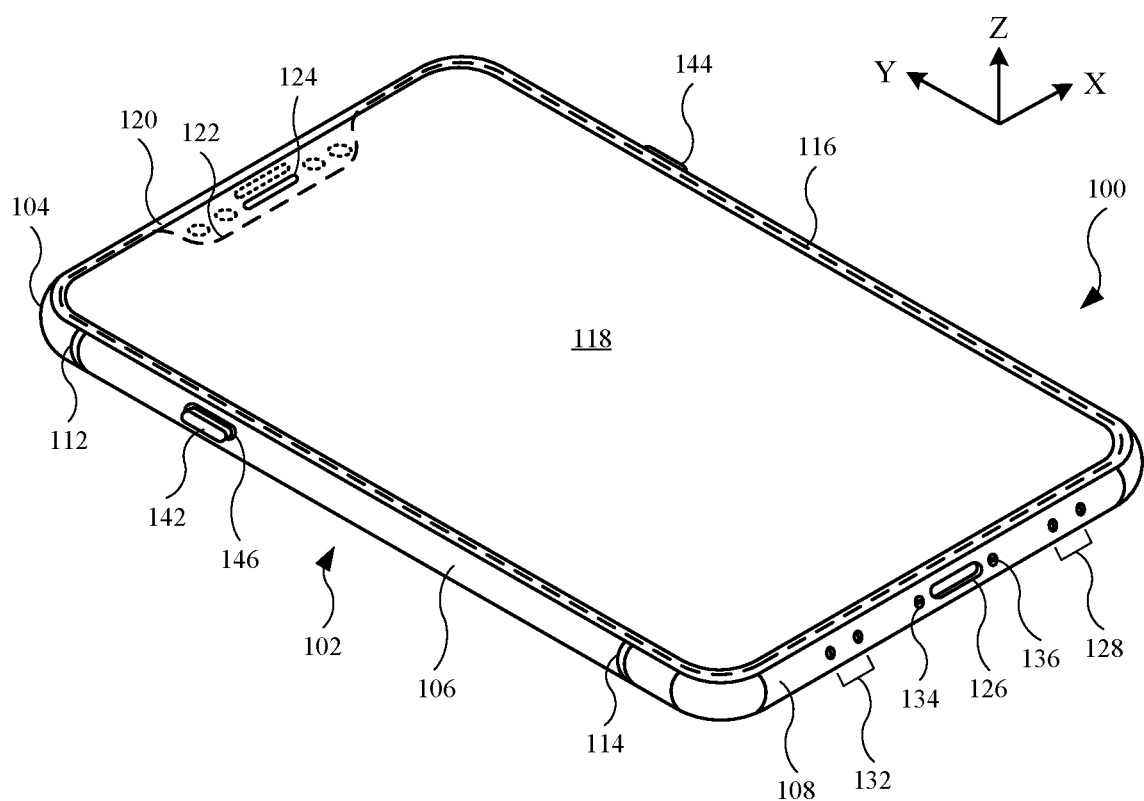
FIG. 1 illustrates a front isometric view of an embodiment of an electronic device, in accordance with some described embodiments.

Those skilled in the art will appreciate and understand that, according to common practice, various features of the drawings discussed below are not necessarily drawn to scale, and that dimensions of various features and elements of the drawings may be expanded or reduced to more clearly illustrate the embodiments of the present invention described herein.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting such that other embodiments may be used, and changes may be made without departing from the spirit and scope of the described embodiments.

The following disclosure relates to an electronic device, such as a mobile communication device that takes the form of a smartphone or a tablet computer device. The electronic device may include several enhancements and modifications not found in traditional electronic devices. For example, the electronic device may include a protective cover (formed from a transparent material) and a display assembly coupled with the protective cover. The electronic device may further include a border positioned between the protective cover and the display assembly. The border may include uniform dimensions (such as a uniform border width) designed to uniformly cover an outer edge (or outer peripheral region) of the display assembly. In this manner, when the display assembly illuminates to present visual information (textual, still images, or motion images, i.e., video), the display assembly illuminates at least to the edges of the border, thereby providing the electronic device with an "edge-to-edge" appearance, as the visual information can be seen at the edges of the border.

The electronic device may further include a vision system used for object recognition, including facial recognition. A bracket assembly may hold the vision system in the electronic device. Rather than fixing the bracket assembly with an enclosure, or housing, of the electronic device, the bracket assembly can move relative to the enclosure, and can be subsequently aligned during an assembly operation of the protective cover to the enclosure. In this regard, the protective cover may include an alignment module used to align the vision system. The alignment module may engage, or contact, the vision system, causing both the vision system and the bracket assembly to move (relative to the enclosure) in order to align the vision system in a desired manner. This allows for a dynamic alignment of the vision system with fewer tolerance issues, as a rigid alignment of the bracket assembly (by, for example, screws, fasteners, clips, etc.) is not required.

The vision system may include operational components such as a camera module, a light emitting module, and a light receiving module (which may include an additional camera module). The bracket assembly is designed to maintain a fixed spacing, or distance, between the camera module, the light emitting module, and the light receiving module. When placed in the bracket assembly and subsequently into the enclosure, the vision system may undergo a calibration operation in order to adjust, or correct, any deviations (relative to a predetermined standard) of the camera module, the light emitting module, and/or the light receiving module. Once the calibration is complete, the fixed spacing, or distance, between the camera module, the light emitting module, and the light receiving module are maintained by the bracket assembly. Moreover, should the electronic device receive a force sufficient to cause movement of the bracket assembly, each of the operational components of the vision system may undergo a corresponding movement, as the bracket assembly maintains the fixed spacing between the operational components. For example, if the bracket assembly moves or shifts by a millimeter ("mm") relative to the enclosure, then the camera module, the light emitting module, and the light receiving module each move 1 mm, in the same direction as the bracket assembly, such that the respective spacing the camera module, the light emitting module, and the light receiving module is maintained.

The electronic device may further include a circuit board assembly designed to occupy less space in the electronic device. For example, the circuit board assembly may be divided into a first circuit board stacked over a second circuit board. A stacked configuration of multiple circuit boards (one stacked over the other) may reduce the footprint of the circuit board assembly in two dimensions. Also, the aforementioned circuit boards may include operational components (such as integrated circuits or processor circuits) positioned on multiple, opposing surfaces such that some operational components on one circuit board are facing other operations components on the other circuit board. Also, the circuit board assembly may include several interposers, or interconnects, designed to carry signals between the first and second circuit boards, such that the first and second circuit boards (as well as their respective operational components) are in communication with one another.

The electronic device may further include a dual camera assembly. The dual camera assembly may include a first camera module and a second camera module. A light emitter (such as a strobe light) may be positioned between the first camera module and the second camera module. While the light emitter is designed to enhance the overall image quality captured by the first camera module and/or the second camera module, the light emitter should be isolated from the first camera module and the second camera module such that light from the light emitter does not "leak," or extend to, the first camera module and/or the second camera module and expose the camera modules to additional unwanted light. This promotes the first camera module and the second camera module receiving indirect (or reflected) light from the light emitter, as opposed to direct light. In order to isolate the light emitter, the dual camera assembly may include a trim structure formed from an opaque material, such as steel (including stainless steel). The trim structure may include multiple walls and chambers designed to i) receive the first camera module, the second camera module, and the light emitter, and ii) isolate the first camera module and the second camera module from directly obtaining light from the light emitter.

The electronic device may further include a battery assembly that includes multiple battery components. For example, the battery assembly may include a first battery component coupled to a second battery component, with each of the first battery component and the second battery component designed to generate energy for operational components (such as integrated circuits carried by the circuit board assembly, the vision system, and/or the dual camera assembly, as non-limiting examples).

The electronic device may further include wireless power receiving module designed to receive an induced current by magnetic flux (from an alternating electromagnetic field) and use the induced current to provide energy to charge the battery assembly. The wireless power receiving module may include a receiver coil that receives the induced alternating current, which can be converted to a direct current. The wireless power receiving module may provide a simplified method for charging the battery assembly, whereby exposure to the magnetic flux, rather than plugging a connector (of a cable assembly) into the electronic device, is sufficient to charge the battery assembly.

These and other embodiments are discussed below with reference to FIGS. 1-32. However, those skilled in the art will readily appreciate that the detailed description given herein with respect to these Figures is for explanatory purposes only and should not be construed as limiting.

FIG. 1 illustrates a front isometric view of an embodiment of an electronic device 100, in accordance with some described embodiments. In some embodiments, the electronic device 100 is a tablet computer device. In the embodiment shown in FIG. 1, the electronic device 100 is a mobile wireless communication device, such as a smartphone, as a non-limiting example. The electronic device 100 may include a band 102 that extends and defines an outer perimeter of the electronic device 100. The band 102 may include a metal, such as aluminum, stainless steel, or an alloy that includes at least one of aluminum or stainless steel. The band 102 may be composed of several sidewall components, such as a first sidewall component 104, a second sidewall component 106, a third sidewall component 108 (opposite the first sidewall component 104), and a fourth sidewall component (not labeled in FIG. 1). The aforementioned sidewall components may include any material(s) previously described for the band 102.

In some instances, some of the sidewall components form part of an antenna assembly (not shown in FIG. 1). As a result, a non-metal material, or materials, may separate the sidewall components of the band 102 from each other in order to electrically isolate the sidewall components. For example, a first composite material 112 separates the first sidewall component 104 from the second sidewall component 106, and a second composite material 114 separates the second sidewall component 106 from the third sidewall component 108. The aforementioned composite material may include an electrically inert, or insulating, material(s), such as plastics and/or resin, as non-limiting examples.

The electronic device 100 may further include a display assembly 116 (shown as a dotted line) that is covered by a protective cover 118. The protective cover 118 may be referred to a transparent protective cover, as the protective cover 118 may include a material such as glass, plastic, sapphire, or the like. In this regard, the protective cover 118 may be referred to as a transparent cover, a transparent protective cover, or a cover glass (when the protective cover 118 includes glass). The display assembly 116 may include multiple layers (discussed below), with each layer providing a unique function. The display assembly 116 may be partially covered by a border 120 that extends along an outer edge of the protective cover 118 and partially covers an outer edge of the display assembly 116. The border 120 can be positioned to hide or obscure electrical and mechanical connections between the layers of the display assembly 116 and flexible circuit connectors to the display assembly 116. This will be shown below. Also, the border 120 to may include uniform thickness. For example, the border 120 may include a thickness that generally does not change in the X- and Y-dimensions. This will be further discussed below. Also, the border 120 may include an opaque material, such as ink or other pigmented material, adhered to the protective cover 118. The adhering means may include an adhesive mixed with the ink (or other pigment material), or an adhesive layer between the protective cover 118 and the border 120. Also, the protective cover 118 may cover the border 120 such that the protective cover 118 is elevated with respect to the border 120 in the Z-dimension (of a Cartesian coordinate system).

Also, as shown in FIG. 1, the display assembly 116 may include a notch 122, representing an absence of the display assembly 116. The notch 122 may allow for a vision system (discussed below) that provides the electronic device 100 with information for object recognition, such as facial recognition. The electronic device 100 may include a masking layer (not labeled in FIG. 1) designed to hide or obscure the vision system, while openings of the masking layer allow the vision system to receive the object recognition information. This will be further discussed below. As shown in FIG. 1, the protective cover 118 includes an opening 124, which may represent a single opening of the protective cover 118. The opening 124 may allow for transmission of acoustical energy (in the form of audible sound) out of the electronic device 100, which may be generated by an audio module (not shown in FIG. 1) of the electronic device 100. Further, the opening 124 may allow for transmission of acoustical energy (in the form of audible sound) into the electronic device 100, which may be received by a microphone (not shown in FIG. 1) of the electronic device 100. Also, as shown in FIG. 1, the electronic device 100 may not include a button, such as a "home button," commonly found in electronic devices, as the protective cover 118 does not include additional openings.

The electronic device 100 may further include a port 126 designed to receive a connector (not shown in FIG. 1) of a cable assembly. The port 126 allows the electronic device 100 to send and receive data information to and from another device (not shown in FIG. 1), and also allows the electronic device 100 to receive electrical energy to charge a battery assembly (not shown in FIG. 1). Accordingly, the port 126 may include terminals (not shown in FIG. 1) that electrically couple to the connector.

Also, the electronic device 100 may include several openings in the sidewall components. For example, the electronic device 100 may include openings 128 that allow an additional audio module (not shown in FIG. 1) of the electronic device 100 to emit acoustical energy out of the electronic device 100. The electronic device 100 may further include openings 132 that allow an additional microphone (not shown in FIG. 1) of the electronic device to receive acoustical energy. Also, the electronic device 100 may include a first fastener 134 and a second fastener 136 designed to secure with a rail (not shown in FIG. 1) that is coupled to the protective cover 118. In this regard, the first fastener 134 and the second fastener 136 are designed to couple the protective cover 118 with the band 102.

The electronic device 100 may include several control inputs designed to provide a command to the electronic device 100. For example, the electronic device 100 may include a first control input 142 and a second control input 144. The aforementioned control inputs may be used to adjust the visual information presented on the display assembly 116 and/or the volume of acoustical energy output by an audio module, as non-limiting examples. The control inputs may include one of a switch or a button designed to generate a command to a processor circuit (not shown in FIG. 1). The control inputs may at least partially extend through openings in the sidewall components. For example, the second sidewall component 106 may include an opening 146 that receives the first control input 142.

Figure 2:
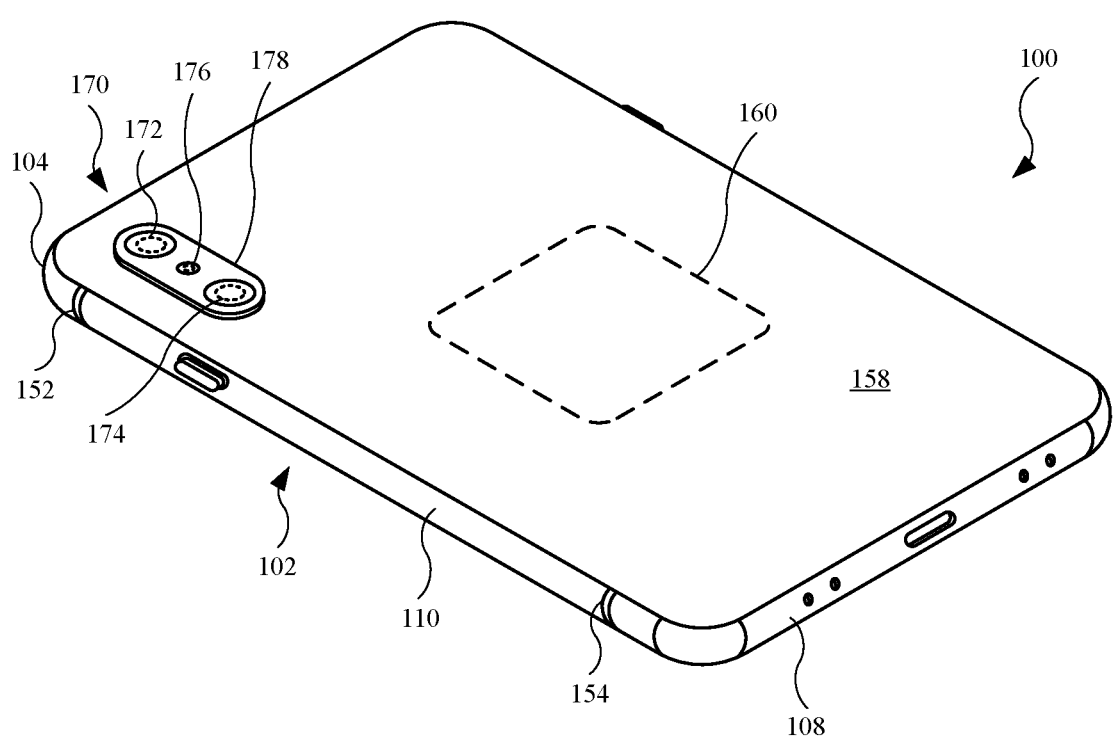
FIG. 2 illustrates a rear isometric view of the electronic device shown in FIG. 1.

FIG. 2 illustrates a rear isometric view of the electronic device 100 shown in FIG. 1. In addition to the aforementioned sidewall components, the band 102 may further include a fourth sidewall component 110. As shown, a third composite material 152 separates the first sidewall component 104 from the fourth sidewall component 110, and a fourth composite material 154 separates the fourth sidewall component 110 from the third sidewall component 108.

The electronic device 100 may further include a protective cover 158 that couples with the band 102. In this regard, the protective cover 158 may combine with the band 102 to form an enclosure of the electronic device 100, with the enclosure (band 102 and protective cover 158) defining an internal volume that carries several components, such as a battery assembly, circuit board assembly, and vision system, as non-limiting examples. The protective cover 158 may include any material(s) previously described for the protective cover 118 (shown in FIG. 1). When the protective cover 158 includes a non-metal material, the electronic device 100 may provide hardware (and software) to support wireless charging. For example, the electronic device 100 may include a wireless power receiving module 160 (represented by a dotted line) covered by the protective cover 158 and positioned in the internal volume. The wireless power receiving module 160 is designed to receive an induced current when exposed to magnetic flux from an alternating electromagnetic field that is external to the electronic device 100. This will be further discussed below. Also, the protective cover 118 (shown in FIG. 1) may be referred to as a "front protective cover" or "first protective cover," as the front of the electronic device 100 is generally associated with the display assembly 116 (which is covered by the protective cover 118). Also, the protective cover 158 may be referred to as a "rear protective cover," "second protective cover," or "bottom wall," as the back of the electronic device 100 is generally associated with a rear wall.

The electronic device 100 may further include a camera assembly 170, which may include a dual camera assembly. As shown, the camera assembly 170 may include a first camera module 172, a second camera module 174, and a light emitter 176 positioned between the first camera module 172 and the second camera module 174. The light emitter 176, also referred to as a camera flash module, is designed to provide additional lighting during an image capture event by the first camera module 172 and/or the second camera module 174. However, it is desired to prevent some of the light "leakage" from the light emitter 176 into the first camera module 172 and the second camera module 174. In this regard, the camera assembly 170 may further include a trim element (not shown in FIG. 1) designed to isolate the light emitter 176 from the first camera module 172 and the second camera module 174 such that the first camera module 172 and the second camera module 174 do not directly receive light from the light emitter 176. In this manner, the first camera module 172 and the second camera module 174 may only receive desired light from the light emitter 176, such as light reflected from an object, the image of which is captured by the first camera module 172 and/or the second camera module 174. The trim element will be further shown and described below. Also, the camera assembly 170 may further include a protective cover 178 formed from a transparent material that covers at least the first camera module 172 and the second camera module 174. However, the protective cover 178 may include a masking layer (not shown in FIG. 2) designed to at least partially obscure part of the first camera module 172 and the second camera module 174. Further, the protective cover 178 may include an opening (not labeled) for the light emitter 176. It should be noted, however, that the masking layer includes openings that allow the first camera module 172 and the second camera module 174 to capture images, and that allow the light emitter 176 to emit light that exits the electronic device 100. Also, as shown in FIG. 2, the first camera module 172 and the second camera module 174 are aligned (collectively) in a manner that is parallel with respect to the second sidewall component 106 (shown in FIG. 1) and the fourth sidewall component 110. In other words, an imaginary line can be drawn through the first camera module 172 and the second camera module 174 that is parallel with respect the second sidewall component 106 (shown in FIG. 1) and the fourth sidewall component 110.

Figure 3:
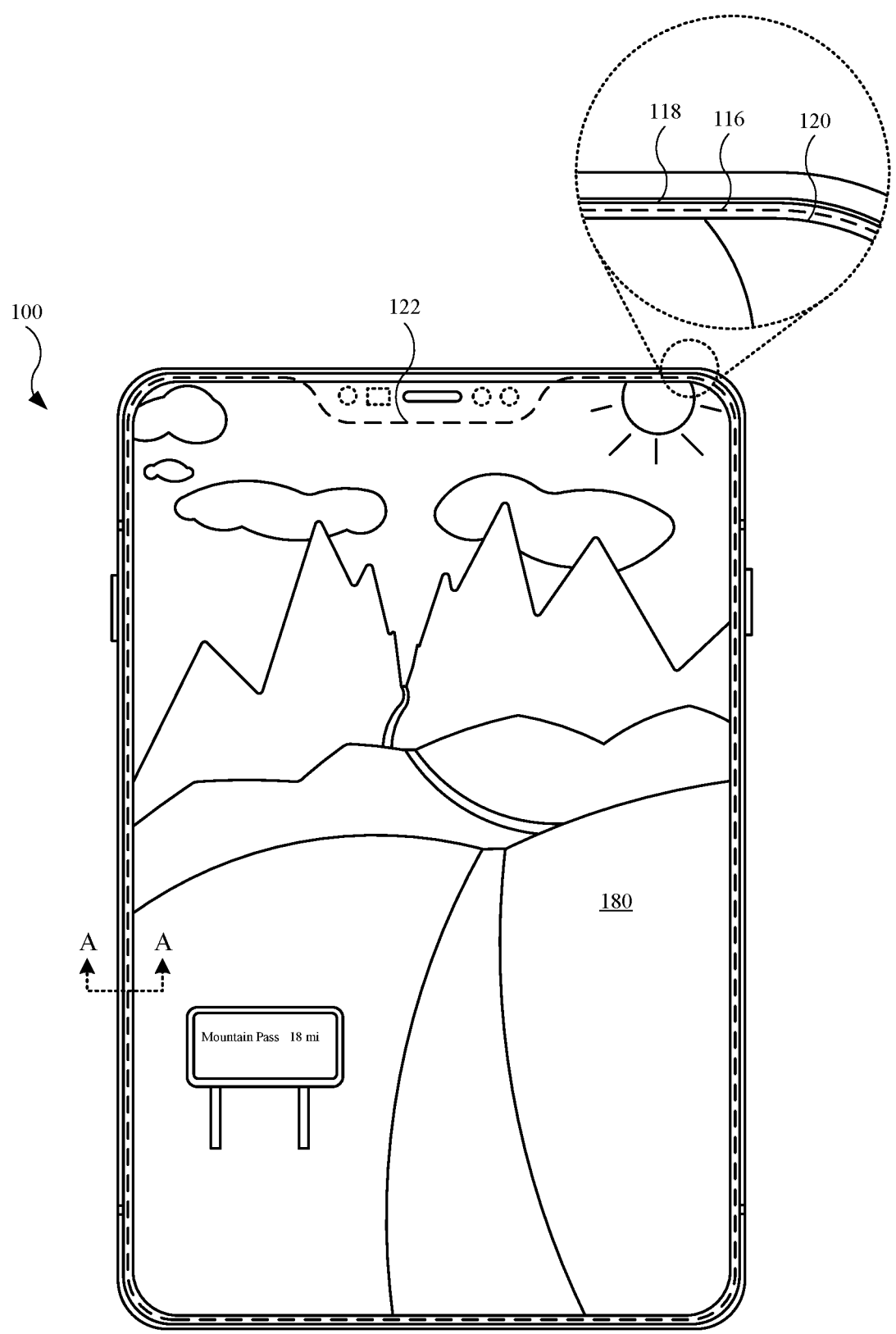
FIG. 3 illustrates a plan view of the electronic device shown in FIG. 1, showing the display assembly illuminated to present visual information.

FIG. 3 illustrates a plan view of the electronic device 100 shown in FIG. 1, showing the display assembly 116 illuminated to present visual information 180. The visual information 180 may take the form of textual information, still images, video images, or some combination thereof. As shown, the visual information 180 may extend at least to the border 120. This is due in part to the border 120 covering an outer edge of the display assembly 116, as shown in the enlarged view. Also, as shown in the enlarged view, an outer edge of the border 120 may extend to an outer edge of the protective cover 118. The border 120 may cover an outer perimeter of the display assembly 116, with the exception of the notch 122 formed in the display assembly 116.

Figure 4:
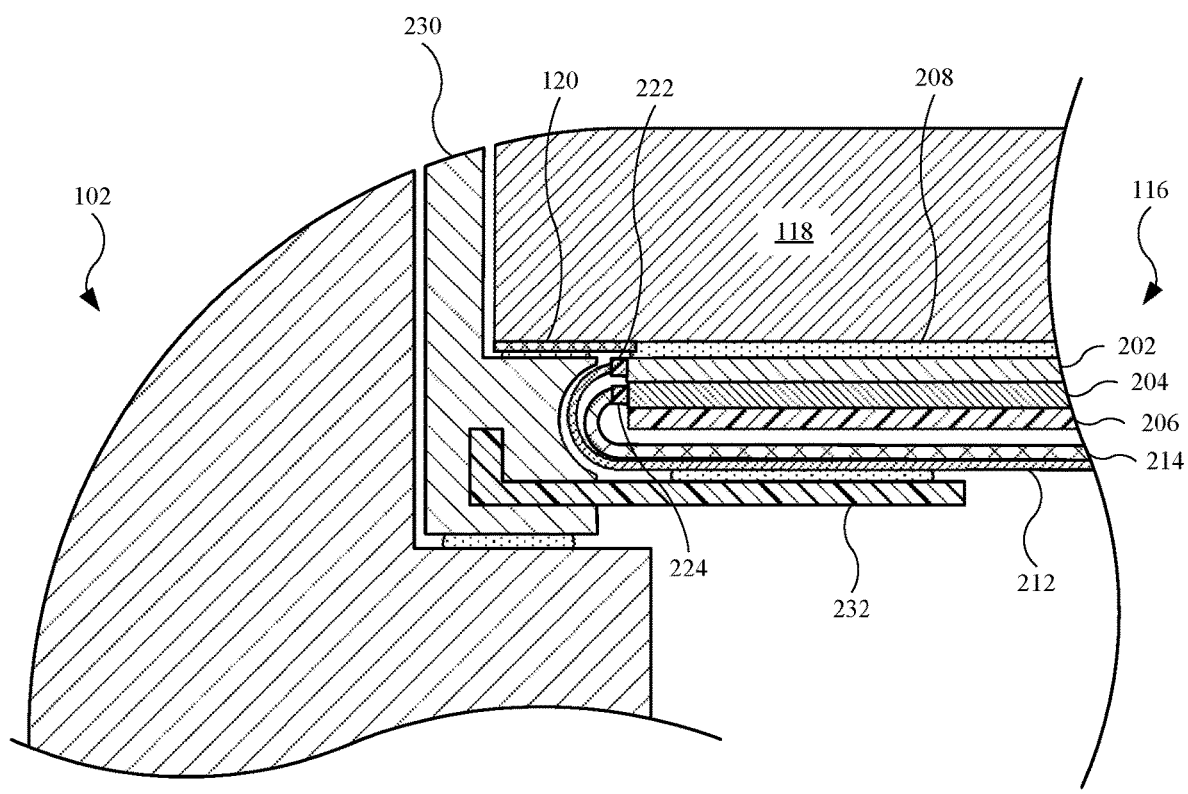
FIG. 4 illustrates a cross sectional view of the electronic device, taken along line A-A in FIG. 3.

FIG. 4 illustrates a cross sectional view of the electronic device 100, taken along line A-A in FIG. 3. As shown, the display assembly 116 may include a touch sensitive layer 202, a display layer 204, and a force sensitive layer 206. The display assembly 116 may be secured with the protective cover 118 by an adhesive 208. Also, although not shown, the display assembly 116 may include adhesive layers to adhesively secure the touch sensitive layer 202 with the display layer 204, and to adhesively secure the display layer 204 with the force sensitive layer 206.

The touch sensitive layer 202 is designed to receive a touch input when, for example, a user (not shown in FIG. 4) depresses the protective cover 118. The touch sensitive layer 202 may include capacitive touch-sensitive technology. For example, the touch sensitive layer 202 may include a layer of capacitive material that holds an electrical charge. The layer of capacitive material is designed to form a part of multiple capacitive parallel plates throughout a location corresponding to the display layer 204. In this regard, when a user touches the protective cover 118, the user forms one or more capacitors. Moreover, the user causes a voltage drop across one or more of the capacitors, which in turns causes the electrical charge of the capacitive material to change at a specific point (or points) of contact corresponding to a location of the user's touch input. The capacitance change and/or voltage drop can be measured by a processor circuit (not shown in FIG. 4) of the electronic device 100 to determine the location of the touch input. The touch input can be relayed from the touch sensitive layer 202 to a circuit board assembly (shown and described later) by a flexible circuit 212 electrically and mechanically coupled with the touch sensitive layer 202 by a connector 222. As shown, the flexible circuit 212 may bend or curve around the display layer 204 and the force sensitive layer 206 to electrically and mechanically couple with touch sensitive layer 202.

In some embodiments, the display layer 204 includes a liquid crystal display ("LCD") that relies upon backlighting to present the visual information. In the embodiment shown in FIG. 4, the display layer 204 includes an organic light emitting diode ("OLED") display designed to illuminate individual pixels, when needed. Also, the display layer 204 may include a connector 224 used to electrically and mechanically couple the display layer 204 with a flexible circuit 214 that electrically couples with a circuit board assembly (shown later), with flexible circuit 214 placing the display layer 204 in communication with the circuit board assembly. Also, in some embodiments, the display layer 204 may include an active matrix organic light emitting diode ("AMOLED") display.

As shown, the border 120 may secure with the protective cover 118. Also, based on the position of the border 120, the border may hide or obscure the connector 222 and the connector 224. Accordingly, the border 120 may hide or obscure a connection between the flexible circuit 212 and the connector 222, as well as a connection between the flexible circuit 214 and the connector 224. Further, the border 120 may be minimized (while maintaining its uniform thickness in the Y-dimension) to cover the connections while also minimally hiding or obscuring the display assembly 116, and in particular, the display layer 204.

The force sensitive layer 206 may operate by determining an amount of force or pressure applied to at least one of the protective cover 118, the touch sensitive layer 202, and/or the display layer 204. In this regard, the force sensitive layer 206 may distinguish between different amounts of force applied to the electronic device 100. The different amounts of force may correspond to different user inputs. The force sensitive layer 206 may include multiple parallel capacitor plate arrangements, with one plate of each capacitor plate arrangement having an electrical charge. When a force to the protective cover 118 causes the distance between one or more pairs of parallel plate capacitor to reduce, a change in capacitance between one or more pairs of parallel plate capacitors may occur. The amount of change in capacitance corresponds to an amount of force exerted on the protective cover 118. Also, although not shown, the force sensitive layer 206 may include a connector that is used to connect with a flexible circuit to place the force sensitive layer 206 in communication with a circuit board assembly.

Further, in order to support the protective cover 118 and facilitate assembly of the protective cover 118 with the band 102, the electronic device 100 may include a frame 230 that receives and secures with the protective cover 118 by an adhesive layer (shown, not labeled). Accordingly, the frame 230 may include an opening with a size and shape in accordance with that of the protective cover 118. The frame 230 may be positioned at least partially between the protective cover 118 and the band 102. The frame 230 may be formed from a polymeric material, such as plastic. The frame 230 may include a supporting element 232 partially embedded in the frame 230. In some embodiments, the supporting element 232 includes a ring formed from a metal material that continuously extends around the display assembly 116 in accordance with the frame 230. However, the supporting element 232 may also be discontinuous, and accordingly, may be selectively embedded in the frame 230. As shown, the supporting element 232 may extend along the frame 230 to support the display assembly 116 and the protective cover 118. Also, the flexible circuit 212 may adhesively secure with the supporting element 232 by an adhesive layer (labeled, not labeled).

Figure 5:
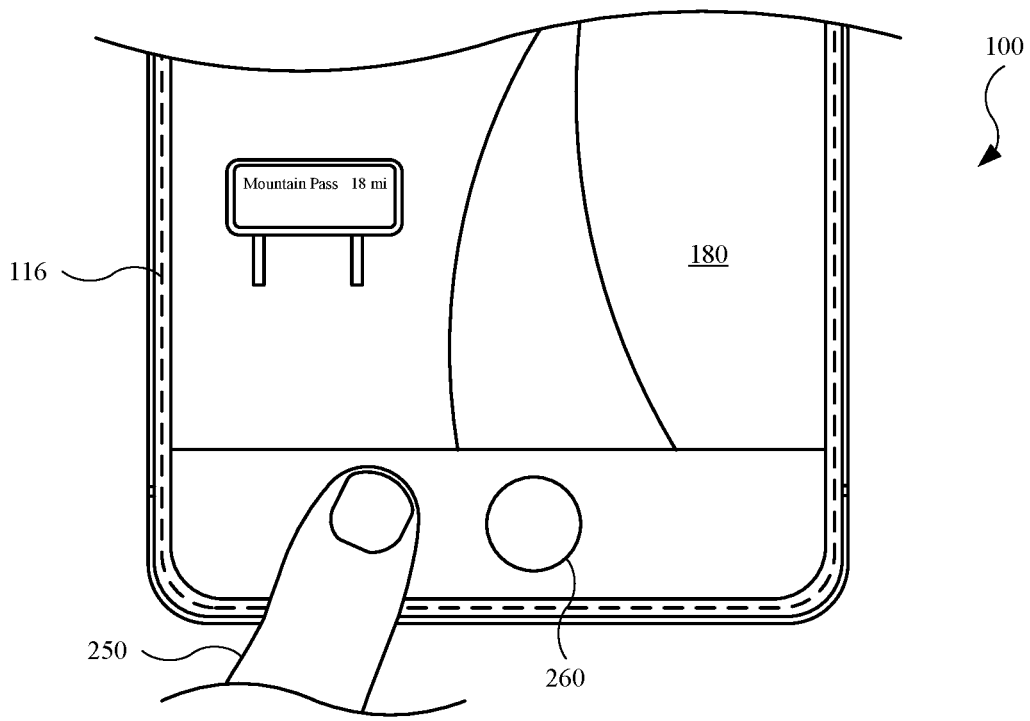
FIG. 5 illustrates a plan view of the electronic device shown in FIG. 1, further showing a user interacting with the display assembly to alter the visual information, in accordance with some described embodiments.

Although the electronic device 100 may lack a dedicated input (such as a home button), the electronic device 100 may nonetheless include virtual inputs presented on the display assembly 116. For example, FIG. 5 illustrates a partial plan view of the electronic device shown in FIG. 3, further showing a user 250 interacting with the display assembly 116 to alter the visual information 180, in accordance with some described embodiments. As shown, when the user 250 interacts with the display assembly 116, the touch sensitive layer 202 (shown in FIG. 4) of the display assembly 116 may determine the interaction, including a location of the interaction. The interaction may cause the visual information 180 to present a virtual button 260. The virtual button 260 may remain on the display assembly 116, and may act as a specific input designed to "close," or remove, at least some of the visual information 180 that was previously presented, and subsequently present a "home screen," as a non-limiting example. The home screen, as presented by the visual information 180 (when updated), may be associated with a main screen, or starting screen, that presents specific applications (not shown), or software applications, selectable by the user 250.

Figure 6:
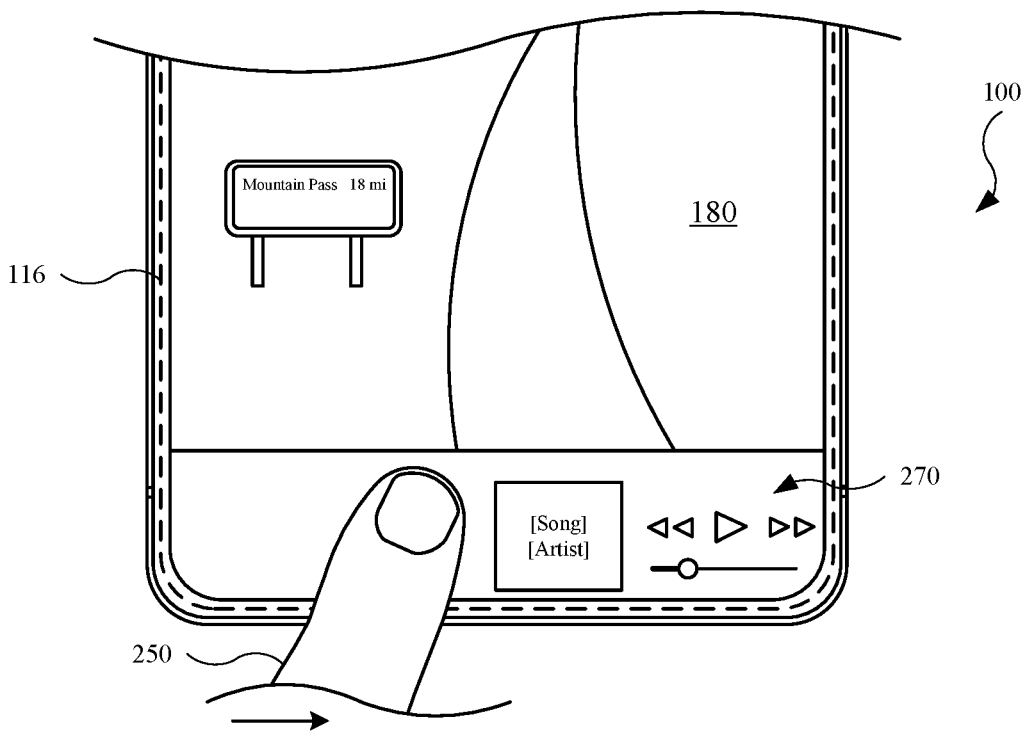
FIG. 6 illustrates a plan view of the electronic device shown in FIG. 3, further showing the user interacting with the display assembly to further alter the visual information, in accordance with some described embodiments.

FIG. 6 illustrates a partial plan view of the electronic device shown in FIG. 3, further showing the user 250 interacting with the display assembly 116 to further alter the visual information 180, in accordance with some described embodiments. As shown, the user 250 may interact with the display assembly 116 using a gesture (such as a swipe, indicated by the arrow). The display assembly 116 may detect the gesture (using one of the aforementioned layers of the display assembly 116), which in turn causes the visual information 180 to present application information 270. The application information 270 may be associated with a software application in use by the user 250, such as a media player application. The application information 270 may quickly and easily allow the user 250 to alter the software application by, for example, adjusting the song or video being played as well as the volume at which the song or video is played. It should be noted that the application information 270 is not limited to a music player application, and several other types of information may be presented on the display assembly 116.

Figure 7:
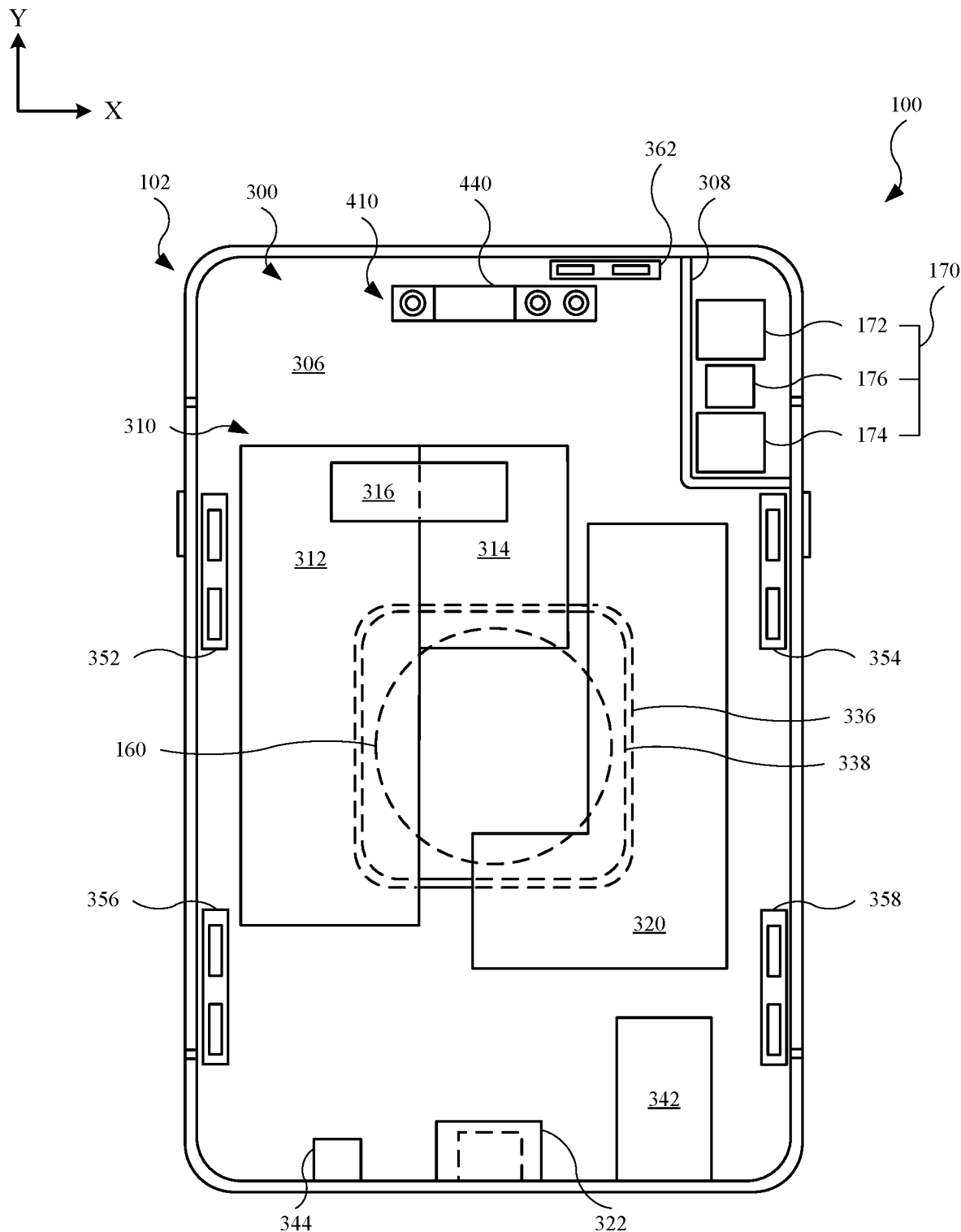
FIG. 7 illustrates a plan view of the electronic device shown in FIG. 1, with the display assembly and the protective cover removed, showing the layout of several components in the internal volume.

FIG. 7 illustrates a plan view of the electronic device 100 shown in FIG. 1, with the display assembly and the protective cover removed, showing the layout of several components in the internal volume 300. For purposes of simplicity and illustration, electrical connections, such as flexible circuit, wires, cables, etc., between components are removed. As shown, the electronic device 100 may include a vision system 410 and a bracket assembly 440 used to carry the vision system 410. The vision system 410 may provide with the electronic device 100 with information related to object recognition, including facial recognition. The bracket assembly 440 is designed to structurally support components of the vision system 410 and maintain a fixed distance between the optical components of the vision system 410. The features of the vision system 410 and the bracket assembly 440 will be further discussed below.

The electronic device 100 may further include a chassis 306 that provides structural support. The chassis 306 may include a rigid material, such as a metal. Also, the chassis 306 may be coupled to the band 102. In this manner, the chassis 306 may also provide an electrical grounding path for components electrically coupled to the chassis 306. Also, the chassis 306 may include a wall 308. The wall 308 may combine with the band 102 to surround the first camera module 172, the second camera module 174, and the light emitter 176 of the camera assembly 170. The wall 308 may also limit or prevent light generated from the light emitter 176 from further entering the internal volume 300.

The electronic device 100 may further include a battery assembly 310 that includes a first battery component 312 coupled with a second battery component 314 by coupling member 316. The coupling member 316 may include an adhesive material. Both the first battery component 312 and the second battery component 314 are designed to generate electrical energy that can be used by several aforementioned components in the internal volume 300. Also, as shown in FIG. 7, the battery assembly 310 resembles an L-shape, based upon the combined shape of the first battery component 312 and the second battery component 314.

The shape of the battery assembly 310 may accommodate other components in the internal volume 300. For example, the electronic device 100 may further include a circuit board assembly 320. The circuit board assembly 320 may include at least two circuit boards in a stacked configuration. The stacked configuration may conserve space in the internal volume 300, particularly in least one of the X- and Y-dimensions, as well as a Z-dimension (perpendicular to an X-Y plane). The circuit board assembly 320 may include several active components (such as integrated circuits) that provide the primary processing for the electronic device 100. Also, similar to the battery assembly 310, the circuit board assembly 320 may resemble an L-shape. In this manner, both the battery assembly 310 and the circuit board assembly 320 can be shaped to conserve space in the internal volume 300.

The electronic device 100 may further include a dock 322 in a location corresponding to the port 126 (shown in FIG. 1). The dock 322 may include terminals and other electrical connection points (not shown in FIG. 7). The dock 322, in conjunction with the port 126, can receive a connector (used with a cable assembly), thereby allowing the electronic device 100 to send and receive data. Also, the dock 322 can receive electrical energy used to recharge the battery assembly 310.

The electronic device 100 may further include a wireless power receiving module 160 designed to provide electrical energy to the battery assembly 310. The wireless power receiving module 160 may include a receiver coil (not shown in FIG. 7) designed to receive an induced current by magnetic flux an alternating electromagnetic field generated by a transmitter coil (not shown) that is external with respect to the electronic device 100. Also, the chassis 306 may include an opening 336 (defined by a void in the chassis 306) such that the chassis 306 does not impede the magnetic flux. Also, the wireless power receiving module 160 may include a shielding element 338 that is positioned between the wireless power receiving module 160 and components in order to shield at least some of the components in the internal volume 300 from the magnetic flux.

The electronic device 100 may further include an audio module 342 designed to generate acoustical energy in the form of audible sound. The electronic device 100 may further include a microphone 344 designed to receive acoustical energy. Also, the electronic device 100 may further include several rail clips designed to receive rails secured to the protective cover 118 (shown in FIG. 1). For example, the electronic device 100 may include a first rail clip 352, a second rail clip 354, a third rail clip 356, a fourth rail clip 358, and a fifth rail clip 362. The rails clips are designed to couple with the aforementioned rails. This will be shown below.

Figure 8:
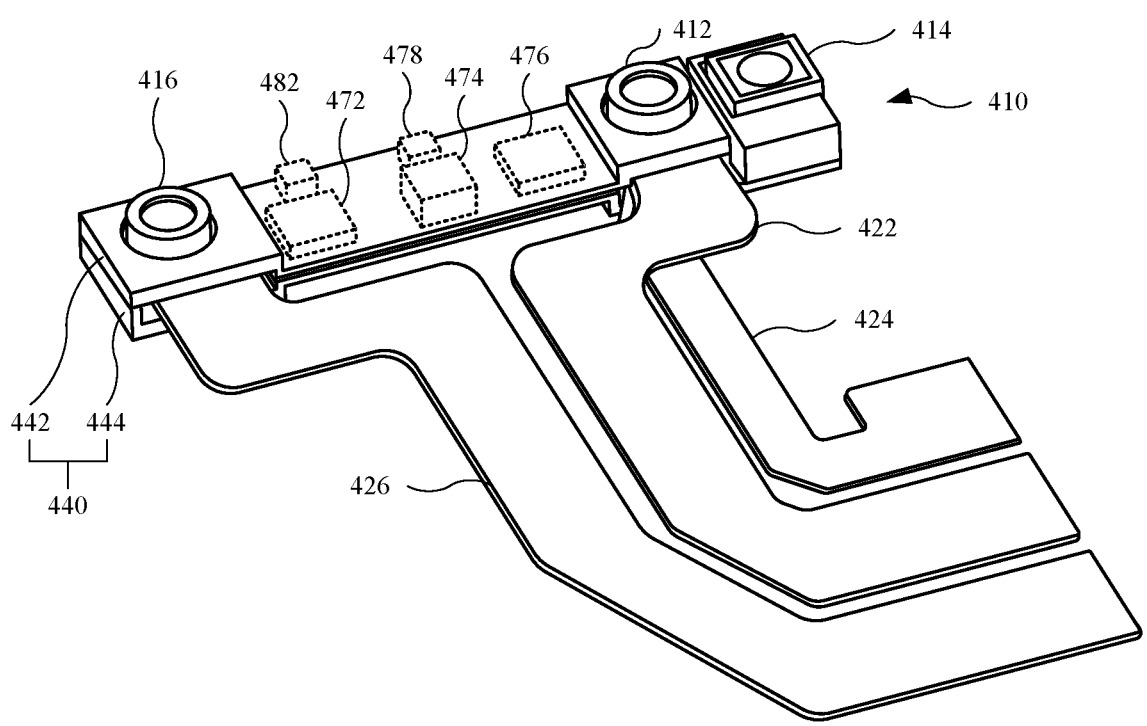
FIG. 8 illustrates a front isometric view of a vision system and a bracket assembly that holds the vision system, in accordance with some described embodiments.

FIG. 8 illustrates a front isometric view of an embodiment of a system 400 that includes a vision system 410, or vision subsystem, and a bracket assembly 440 designed to carry the vision system 410, in accordance with some described embodiments. As shown, the vision system 410 may include several operational components (including optical components), with each operational component providing a specific function. For example, the vision system 410 may include a first camera module 412, a light emitting module 414, and a second camera module 416. The first camera module 412, or first operational component, is designed to capture an image of an object (not shown). The light emitting module 414, or second operational component, is designed to emit light, in the form of multiple light rays, in a direction toward the object. Accordingly, the light emitting module 414 may be referred to as a light emitter. In some instances, the light emitting module 414 emits light that is not visible by the human eye. For example, the light emitting module 414 may emit IR light. The second camera module 416, or third operational component, is designed to receive at least some of the light rays that are emitted from the light emitting module 414, subsequent to the light rays reflecting from the object. Accordingly, the second camera module 416 may be referred to as a light receiver. Also, the second camera module 416 may include a filter designed to filter out other types of light outside the frequency range of the light rays emitted from the light emitting module 414. As an example, the filter (located within the second camera module 416 or over a lens of the second camera module 416) may block light other than IR light, and permit IR light into the second camera module 416.

The vision system 410 is designed to assist in object recognition. In this regard, the vision system 410 may use the first camera module 412 to generate a two-dimensional image of the object. In order to determine spatial relationships between various features of the object, the light rays emitted from the light emitting module 414 may project a dot pattern onto the object (or objects). When the light generated from the light emitting module 414 is reflected from the object, the second camera module 416 captures at least some of the reflected light to create an image of the projected dot pattern on the object. The projected dot pattern can be used to form a depth map of the object, with the depth map corresponding to a three-dimensional counterpart of the object. The combination of the image (taken by the first camera module 412) and the dot pattern (taken by the second camera module 416) projected onto the image can be used to develop a three-dimensional profile of the object. In this regard, when the vision system 410 is in an electronic device (not shown), the vision system 410 can assist the electronic device in providing a facial recognition of a user's face. This will be further discussed below.

The bracket assembly 440 may include a first bracket 442 coupled to a second bracket 444. The coupling may include welding, adhering, fastening, clipping, or the like. The first bracket 442 and the second bracket 444 may include a rigid material, such as steel or aluminum. However, other materials, such as plastic (including a molded plastic), are possible. In order for the vision system 410 to provide accurate object recognition, the space or distance between the modules should remain constant, or at least substantially constant. In other words, any relative movement of a module of the vision system 410 with respect to the remaining modules should be prevented or substantially limited. The bracket assembly 440 is designed to provide a rigid system that houses the modules and also prevents relative movement of any module with respect to the remaining modules. Further, when the vision system 410 and the bracket assembly 440 are positioned in an electronic device, external forces exerted on the electronic device (such as a drop of the electronic device against a structure) may cause the vision system 410 and the bracket assembly 440 to move or shift in the electronic device. However, any movement of bracket assembly 440 may correspond to an equal amount of movement of each of the modules of the vision system 410 such that relative movement of the modules of the vision system 410 is prevented. Moreover, in some instances, the bracket assembly 440 is not held or affixed to an enclosure of the electronic device by fasteners, adhesives, clips, or other rigid fixture-type structures. This will be further discussed below.

Each of the modules of the vision system 410 may include a flexible circuit, or flex connector, designed to electrically couple a module to a circuit board (not shown in FIG. 8) to place the vision system 410 in electrical communication with one or more processor circuits (not shown in FIG. 8) positioned on the circuit board. For example, the first camera module 412, the light emitting module 414, and the second camera module 416 may include a first flexible circuit 422, a second flexible circuit 424, and a third flexible circuit 426, respectively, with each of the flexible circuits extending from their respective modules and out of bracket assembly 440. Also, as shown, the first flexible circuit 422 may overlap the second flexible circuit 424 in order to align the flexible circuits in a desired manner.

Optionally, the bracket assembly 440 may define a platform or space designed to receive components of an electronic device, some of which may be used with the vision system 410. For example, the platform, defined by the bracket assembly 440, may carry a first component 472, a second component 474, a third component 476, a fourth component 478, and a fifth component 482. The first component 472 may include a light emitter designed to provide additional light (including additional IR light) while the vision system 410 is in use. The second component 474 may include an audio module designed to generate acoustical energy in the form of audible sound. The third component 476 may include a microphone designed to receive acoustical energy. The fourth component 478 may include a light sensor, including an ambient light sensor, designed to detect an amount light incident on an electronic device (such as the electronic device 100, shown in FIG. 1). The light sensor may be used to trigger use of the first component 472 when the first component 472 includes a light emitter, based upon a determined amount of light by the light sensor. The fifth component 482 may include a proximity sensor designed to determine an approximate distance between a user and the electronic device. The proximity sensor may be used to provide an input used to turn off a display assembly (such as the display assembly, shown in FIG. 1) when a relatively low-light condition is determined, and may also be used to provide an input used to turn on the display assembly when a relatively high light condition is determined. The relatively low and high light conditions may be relatively to a predetermined or threshold light condition. Accordingly, FIG. 8 shows that the bracket assembly 440 may not only carry components of the vision system 410, but also may provide a space for additional components.

Figure 9:
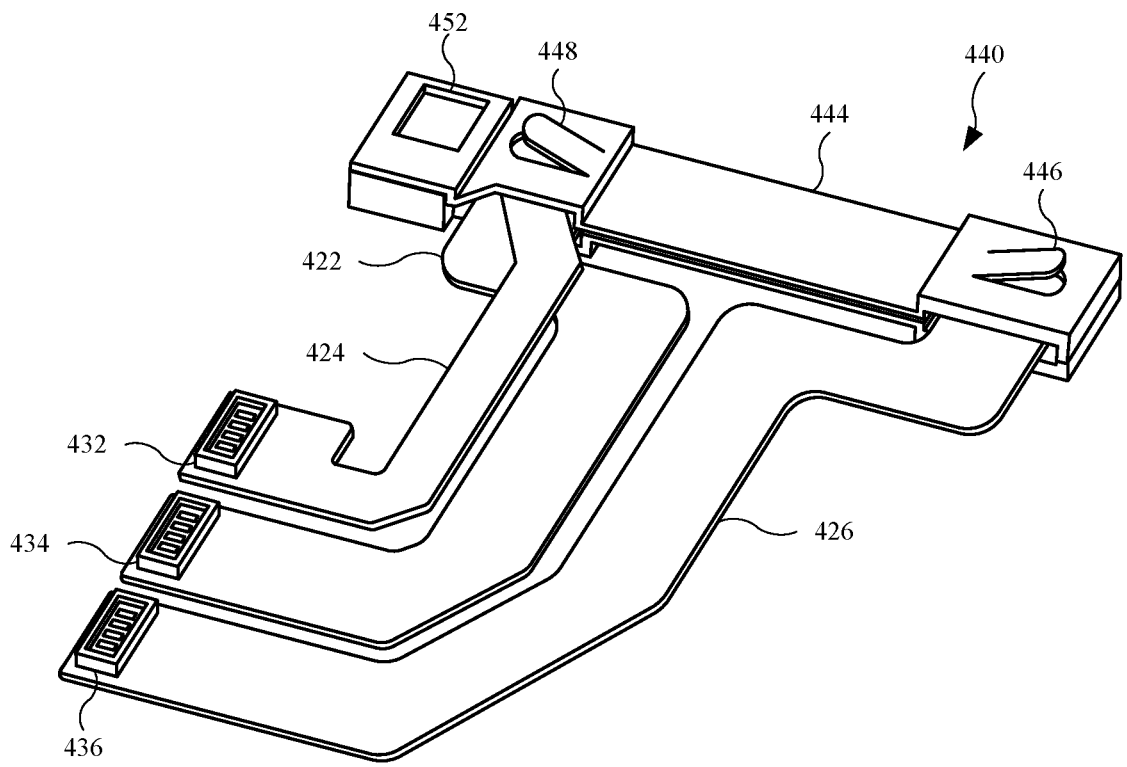
FIG. 9 illustrates a rear isometric view of the vision system and the bracket assembly shown in FIG. 8.

FIG. 9 illustrates a rear isometric view of the vision system and the bracket assembly shown in FIG. 8. As shown, the second bracket 444 may include spring elements, such as a first spring element 446 and a second spring element 448, extending from a surface of the second bracket 444. When the bracket assembly 440 is positioned in an electronic device (not shown in FIG. 9), the spring elements may engage an enclosure of the electronic device (or a chassis, such as the chassis 306 shown in FIG. 7) and support the bracket assembly 440 and the modules of the vision system 410 (labeled in FIG. 8). Further, the spring elements may act as biasing elements that bias the bracket assembly 440 in a direction away from the enclosure. For instance, when a protective cover (such as the protective cover 118, shown in FIG. 1) is secured to the enclosure, the protective cover and/or the enclosure may apply compression forces on the bracket assembly 440, causing bending or flexing of the first spring element 446 and the second spring element 448. However, the first spring element 446 and the second spring element 448 are designed to provide a counterforce that biases the bracket assembly 440 toward the protective cover or against an alignment module (discussed later), thereby providing an enhanced securing force for the bracket assembly 440 (and the vision system 410). This will be further shown below. Also, a cutting operation use to cut the second bracket 444 to form the first spring element 446 and the second spring element 448 may cut only a portion of the second bracket 444 such that the second bracket 444 does not include through holes, or openings, in locations corresponding to the first spring element 446 and the second spring element 448. As a result, the second bracket 444 provides a continuous, uninterrupted support surface for the modules.

In order to electrically couple the modules to a circuit board, the flexible circuits may include connectors. For example, the first flexible circuit 422, the second flexible circuit 424, and the third flexible circuit 426 may include a first connector 432, a second connector 434, and a third connector 436, respectively. Also, the second bracket 444 may include a through hole 452, or opening, in a location corresponding to the light emitting module 414 (shown in FIG. 8). This allows for a heat sinking element (not shown) to pass through the through hole 452 and thermally couple to the light emitting module 414, such that the heat sinking element dissipates heat from the light emitting module 414 and prevents the light emitting module 414 from overheating during use.

FIGS. 8 and 9 show the first bracket 442 and the second bracket 444 combine to receive and secure the first camera module 412, the light emitting module 414, and the second camera module 416. In this regard, the aforementioned modules may enhance or increase the overall rigidity of the bracket assembly 440. For example, the modules may occupy space or voids between the first bracket 442 and the second bracket 444, while also engaging the first bracket 442 and/or the second bracket 444. Accordingly, the modules may prevent the bracket assembly 440 from unwanted twisting or bending.

Also, when the vision system 410 is secured in the bracket assembly 440, the bracket assembly 440 is designed to ensure the modules of the vision system 410 maintain a fixed distance apart from one another. For example, the bracket assembly 440 is designed to maintain a fixed, predetermined distance, between the first camera module 412 and the second camera module 416. Also, the bracket assembly 440 is designed to maintain a fixed, predetermined distance between the light emitting module 414 and the second camera module 416. Further, the bracket assembly 440 is designed to maintain a fixed, predetermined distance between the first camera module 412 and the light emitting module 414. In this regard, the vision system 410 can be calibrated once the modules are assembled in the bracket assembly 440, with the calibration accounting for the fixed distances between the modules, and the bracket assembly 440 eliminates the need to re-calibrate the vision system 410 as the modules maintain their respective fixed distances. By maintaining these fixed distances, the bracket assembly 440 ensures proper and accurate information related to objection recognition capabilities by the vision system 410.

Figure 10:
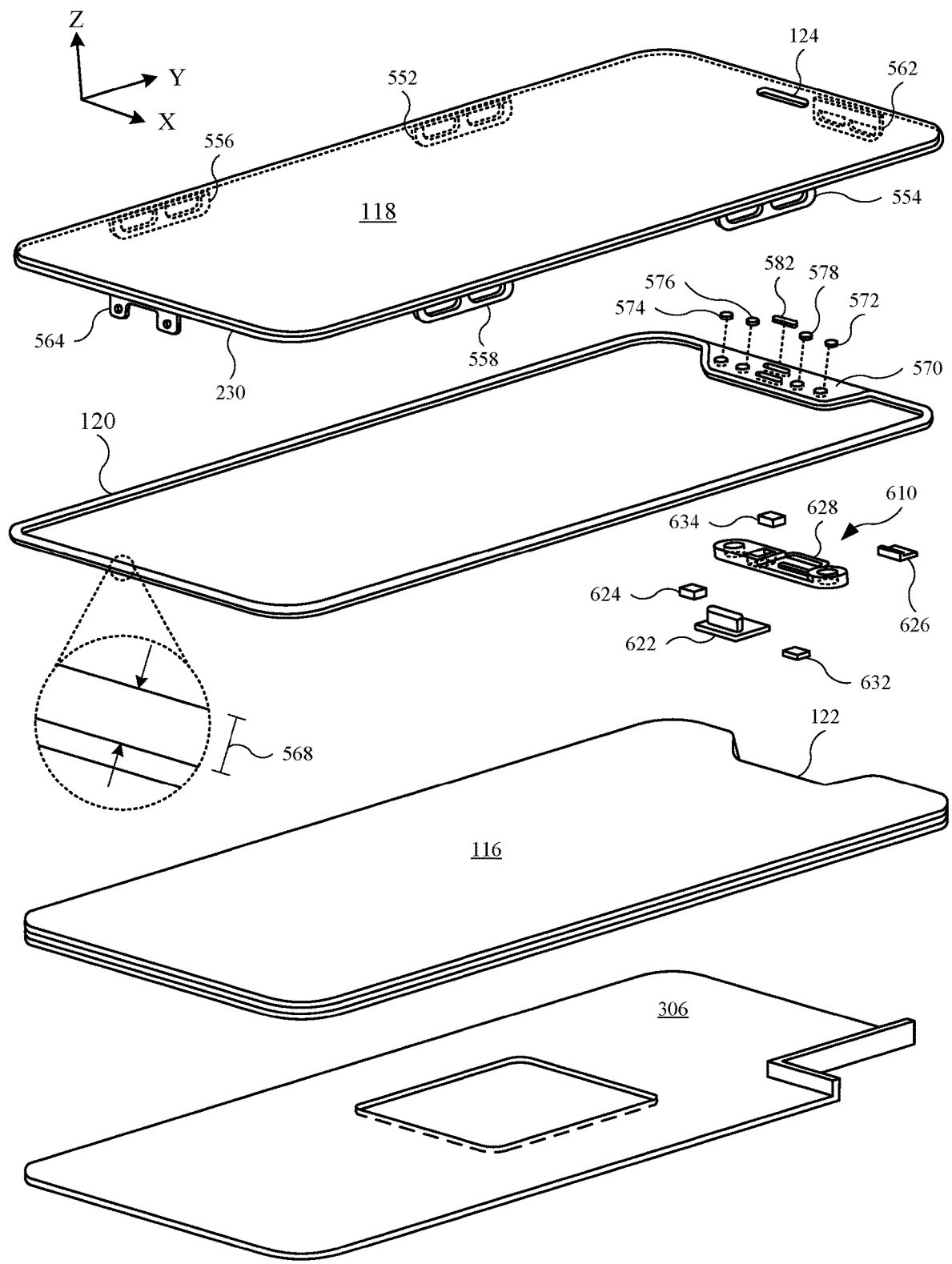
FIG. 10 illustrates an exploded view of the protective cover and the display assembly, as well as several additional components of the electronic device (shown in FIG. 1)

FIG. 10 illustrates an exploded view of the protective cover 118 and the display assembly 116, as well as several additional components of the electronic device 100 (shown in FIG. 1). As shown, the protective cover 118 is surrounded by, and engaging, the frame 230. The frame 230 may include several rails designed to secure the protective cover 118 with an enclosure (not shown in FIG. 10). The frame 230 may include a first rail 552, a second rail 554, a third rail 556, a fourth rail 558, and a fifth rail 562 designed to couple with the first rail clip 352, the second rail clip 354, the third rail clip 356, the fourth rail clip 358, and the fifth rail clip 362, respectively, shown in FIG. 7. Also, the frame 230 may further include a sixth rail 564 designed to receive the first fastener 134 and the second fastener 136 (shown in FIG. 1).

The border 120 may secure with a surface, such as an internal surface, of the protective cover 118. The border 120 may include a uniform dimension 568 (such as a uniform width) in the X-dimension the Y-dimension. Accordingly, the border 120, may include a dimension (such as a "border width") of equal dimensions at any location in the X- and Y-dimensions. In addition to the border 120 hiding or obscuring electrical and mechanical connections to the display assembly 116, additional layers may be used to hide or obscure some features. For example, an electronic device described herein may include a masking layer 570 designed to at least partially hide or obscure the vision system 410 and the bracket assembly 440 (shown in FIGS. 7-9). The masking layer 570 may include an opaque material designed to block light, including visible light, UV light, and IR light. The opaque material may include an ink material that is adhered to a surface, such as an internal surface, of the protective cover 118. Also, the masking layer 570 may include an appearance, in terms of color and reflectivity, designed to match that of the border 120. For example, when the border 120 includes a black or white appearance (as non-limiting examples), the masking layer 570 may include a black or white appearance, respectively. Also, the uniform dimension 568 of the border 120 may extend to locations adjacent to (or in contact with) the masking layer 570.

In order to allow the vision system 410 to provide object recognition, the masking layer 570 may include several openings (not labeled). However, at least some of the openings may be covered or filled by a material that is semi-opaque. For example, an electronic device described herein may include a layer 572 that covers an opening of the masking layer 570, a layer 574 that covers an additional opening of the masking layer 570, and a layer 576 that covers an additional opening of the masking layer 570. In some embodiments, the layer 572, the layer 574, and the layer 576 include an appearance, in terms of color and/or reflectivity, similar to that of the masking layer 570 (and accordingly, an appearance, in terms of color and/or reflectivity, similar to that of the border 120). However, the layer 572, the layer 574, and the layer 576 may be designed to filter out light in some frequencies while selectively passing light in other frequencies. For example, the layer 572, the layer 574, and the layer 576 may block visible light (as well as other light), and pass IR light. As a result, the layer 572, the layer 574, and the layer 576 may be referred to as visible light filters. The layer 572, the layer 574, and the layer 576 may cover components of the vision system 410 (shown in FIGS. 8 and 9) designed to transmit/emit IR light (such as the light emitting module 414 in FIG. 8) or receive IR light (such as the second camera module 416 in FIG. 8). A light module 624 (described below) may also be aligned with a visible light filter.

Further, an electronic device described herein may include a layer 578 and a layer 582, each of which covers an additional opening of the masking layer 570. In some embodiments, the layer 578 and the layer 582 include an appearance, in terms of color and/or reflectivity, similar to that of the masking layer 570 (and accordingly, an appearance, in terms of color and/or reflectivity, similar to that of the border 120). However, the layer 578 and the layer 582 may be designed to filter out some light in some frequencies while selectively passing light in other frequencies. For example, the layer 578 and the layer 582 may block IR light (as well as other light), and pass visible light. As a result, the layer 578 and the layer 582 may be referred to as IR light filters. The layer 578 and the layer 582 may cover components of the vision system 410 (shown in FIGS. 8 and 9) designed to receive visible light (such as the first camera module 412 in FIG. 8). An ambient light sensor 626 (described below) may also be aligned with an IR light filter.

In some instances, the bracket assembly 440 and the vision system 410 (shown in FIGS. 7-9) are not affixed in the electronic device 100 (shown in FIG. 1). Rather, the bracket assembly 440 (along with the vision system 410) may be placed in the internal volume 300 (shown in FIG. 7) and may to generally move freely with respect to, for example, the chassis 306 and the band 102 (shown in FIG. 7). However, as the protective cover 118 is coupled with the band 102 (by way of the rails securing with the rail clips), the position of the bracket assembly 440 and the vision system 410 can be adjusted to a desired location in the internal volume 300, and compressive forces can retain the bracket assembly 440 and the vision system 410 in a desired location.

In this regard, an electronic device described herein may include an alignment module 610 that is coupled with the protective cover 118. In some instances, the masking layer 570 and the light filter layers described above are positioned between the protective cover 118 and the alignment module 610. The alignment module 610 may couple with the protective cover 118 in a location such when the protective cover 118 is assembled with the enclosure (or with the remaining portion of an electronic device), the alignment module 610 guides the modules of the vision system 410 (shown in FIG. 8) such that the modules align with a desired light filter described above. This will be further shown and discussed below.

An electronic device described herein may further include an audio module 622 designed to generate acoustical energy. The audio module 622 may be seated on the alignment module 610 such that the audio module 622 is aligned with the opening 124 of the protective cover 118. An electronic device described herein may further include a light module 624 designed to generate light, such as IR light. The light module 624 may be used in conjunction with the vision system 410 (shown in FIG. 8). For example, the light module 624 may provide additional IR light under conditions of relatively low light. The alignment module 610 may align the light module 624. An electronic device described herein may further include an ambient light sensor 626 designed to detect an amount of light external with respect to the electronic device. In some instances, the ambient light sensor 626 provides light conditions (such as low-light conditions) that can be used to activate the light module 624. The alignment module 610 may include a rail 628 that engages and aligns the ambient light sensor 626. Also, an electronic device described herein may further include a microphone 632 designed to receive acoustical energy. The microphone 632 may be at least partially aligned with the opening 124 of the protective cover 118. Also, an electronic device described herein may further include a proximity sensor 634 designed to determine an approximate distance between a user and the electronic device.

The notch 122 (in the display assembly 116) is designed and positioned to accommodate the alignment module 610, as well as the vision system 410 (shown in FIG. 8). Also, the chassis 306 may be positioned below the display assembly 116 (in the Z-dimension). Accordingly, the chassis 306 may provide support to the display assembly 116 as well as other components. Also, the border 120 may uniformly cover an outer edge of the display assembly 116 in the X- and Y-dimensions, based upon the uniform dimension 568. In other words, in a plane (X-Y plane, for example) parallel to a plane defined by the display assembly 116, the border 120 may uniformly cover the display assembly 116.

Figure 11:
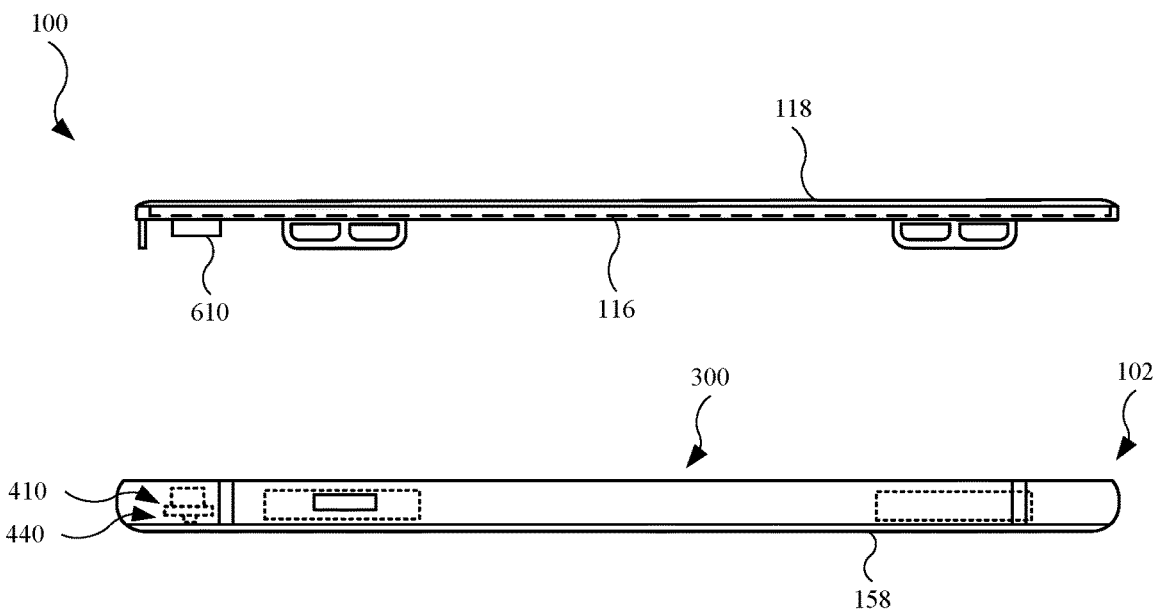
FIG. 11 illustrates a side view of the electronic device, showing the protective cover, the alignment module, and the display assembly prior to assembling with the enclosure, in accordance with some described embodiments.

FIGS. 11-16 show and describe an exemplary assembly operation in which the alignment module 610 is used to align the vision system 410 in a desired location. FIG. 11 illustrates a side view of the electronic device 100, showing the protective cover 118, the alignment module 610, and the display assembly 116 (shown as a dotted line) prior to assembling with the enclosure, in accordance with some described embodiments. The enclosure may include a combination of the band 102 and the protective cover 158. As shown, the vision system 410 and the bracket assembly 440 are positioned in the internal volume 300. Also, the alignment module 610 is secured to the protective cover 118. As shown in FIG. 11, the protective cover 118 may be parallel, or at least substantially parallel, with respect to the band 102. However, the assembly process may include positioning the protective cover 118 at some non-zero angle with respect to the band 102 such that the protective cover 118 is not parallel with respect to the band 102.

Figure 12:
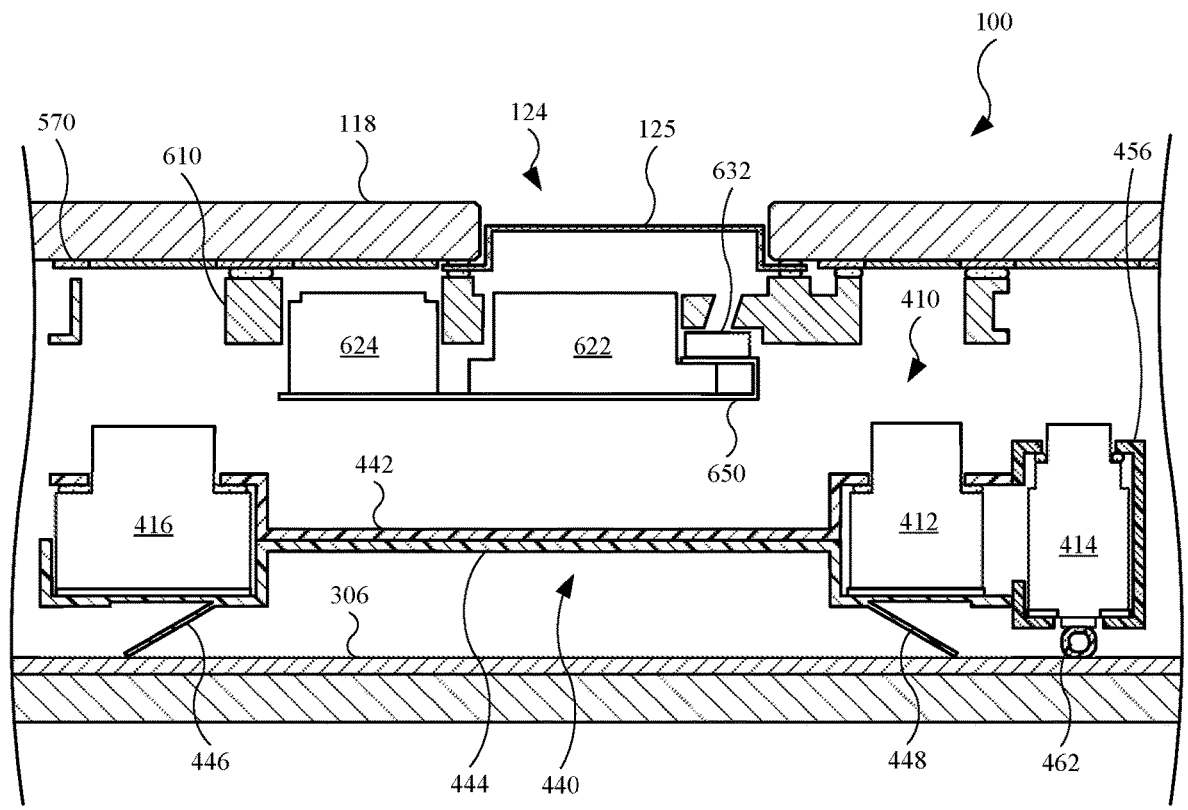
FIG. 12 illustrates a cross sectional view that partially shows the electronic device shown in FIG. 11, showing the vision system and the bracket assembly positioned in the enclosure.

FIG. 12 illustrates a cross sectional view that partially shows the electronic device 100 shown in FIG. 11, showing the vision system 410 and the bracket assembly 440 positioned in the enclosure. The electronic device 100 may include a flexible circuit 650 that is electrically and mechanically coupled to the audio module 622, the light module 624, and the microphone 632. Although not shown in FIG. 12, the ambient light sensor 626 and the proximity sensor 634 (both shown in FIG. 10) may electrically and mechanically couple with the flexible circuit 650. The flexible circuit 650 may electrically and mechanically connected to a circuit board assembly (discussed below), thereby placing the audio module 622, the light module 624, the microphone 632, the ambient light sensor 626, and the proximity sensor 634 in communication with the circuit board assembly. Also, the alignment module 610 is adhesively secured to the protective cover 118. The alignment module 610 is aligned with the protective cover 118 such that when the audio module 622 is positioned in an opening (not labeled) of the alignment module 610, the audio module 622 is aligned with the opening 124 of the protective cover 118. Further, the microphone 632 may be aligned with a diagonal opening (not labeled) of the alignment module 610, and at least partially aligned with the opening 124. Also, as shown, a mesh material 125 may cover the opening 124. Also, the light module 624 may be positioned in an opening (not labeled) of the alignment module 610, and in particular, the light module 624 may align with an opening of the masking layer 570. This will be further discussed below.

As shown, the bracket assembly 440 is designed to hold components of a vision system, such as the first camera module 412, the light emitting module 414, and the second camera module 416. Although not labeled, each of the first camera module 412, the light emitting module 414, and the second camera module 416 may include a flexible circuit. Also, although not labeled, each of the first camera module 412, the light emitting module 414, and the second camera module 416 include an adhesive that secures the modules to the bracket assembly 440. The adhesive may include an electrically conductive adhesive that electrically couples the modules to the bracket assembly 440. Also, the bracket assembly 440 may include a third bracket 456 secured to at least one of the first bracket 442 and the second bracket 444. The third bracket 456 may be referred to as a module carrier that holds the light emitting module 414. The third bracket 456 may attach to at least one of the first bracket 442 and the second bracket 444 by welding, as an example, thereby electrically coupling the brackets together. Other attachment methods that electrically couple the brackets together are possible. Also, as shown, the first spring element 446 and the second spring element 448 may extend from the second bracket 444 and support the bracket assembly 440 and the vision system 410. Also, the first spring element 446 and the second spring element 448 engage the chassis 306. As a result, the vision system 410, including its modules, may be electrically grounded in part by the chassis 306.

The second bracket 444 may include an opening that allows a heat sinking element 462 to thermally couple with the light emitting module 414, either by direct contact with the light emitting module 414 or by way of a block (not labeled), as shown in FIG. 12. The heat sinking element 462 may include a rolled graphite layer that is thermally coupled to the chassis 306. Accordingly, the chassis 306 may provide electrical charge dissipation and thermal dissipation properties. Regarding the latter, the chassis 306 may be referred to as a heat sink.

Figure 13:
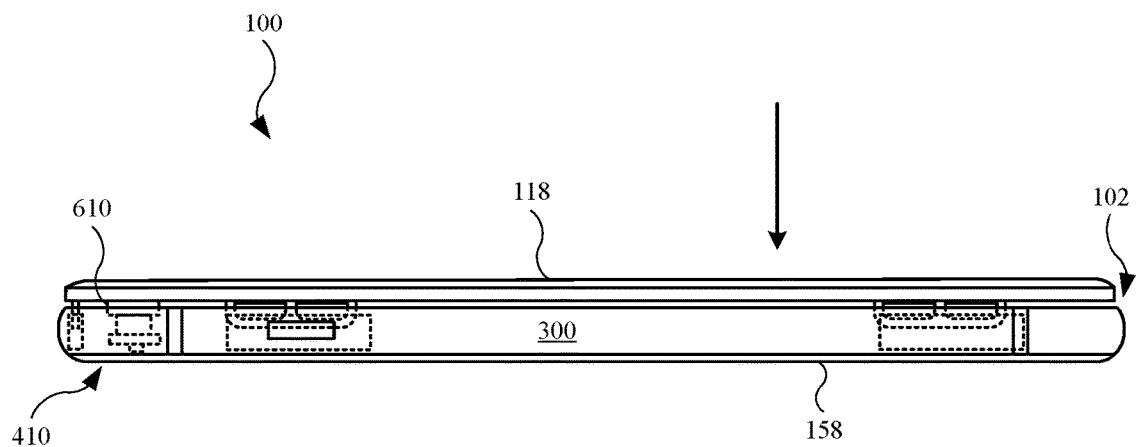
FIG. 13 illustrates a side view of the electronic device shown in FIG. 11, further showing the protective cover being lowered toward the enclosure and the alignment module engaging the vision system.

FIG. 13 illustrates a side view of the electronic device 100 shown in FIG. 11, further showing the protective cover 118 being lowered toward the band 102 such that the alignment module 610 engages the vision system 410. As shown, the engagement force provided by the alignment module 610 to the vision system 410 may cause the vision system 410 and the bracket assembly 440 (not labeled) to shift within the internal volume 300. In this regard, the vision system 410 and the bracket assembly 440 may shift relative to other parts, such as the band 102 and the protective cover 158.

Figure 14:
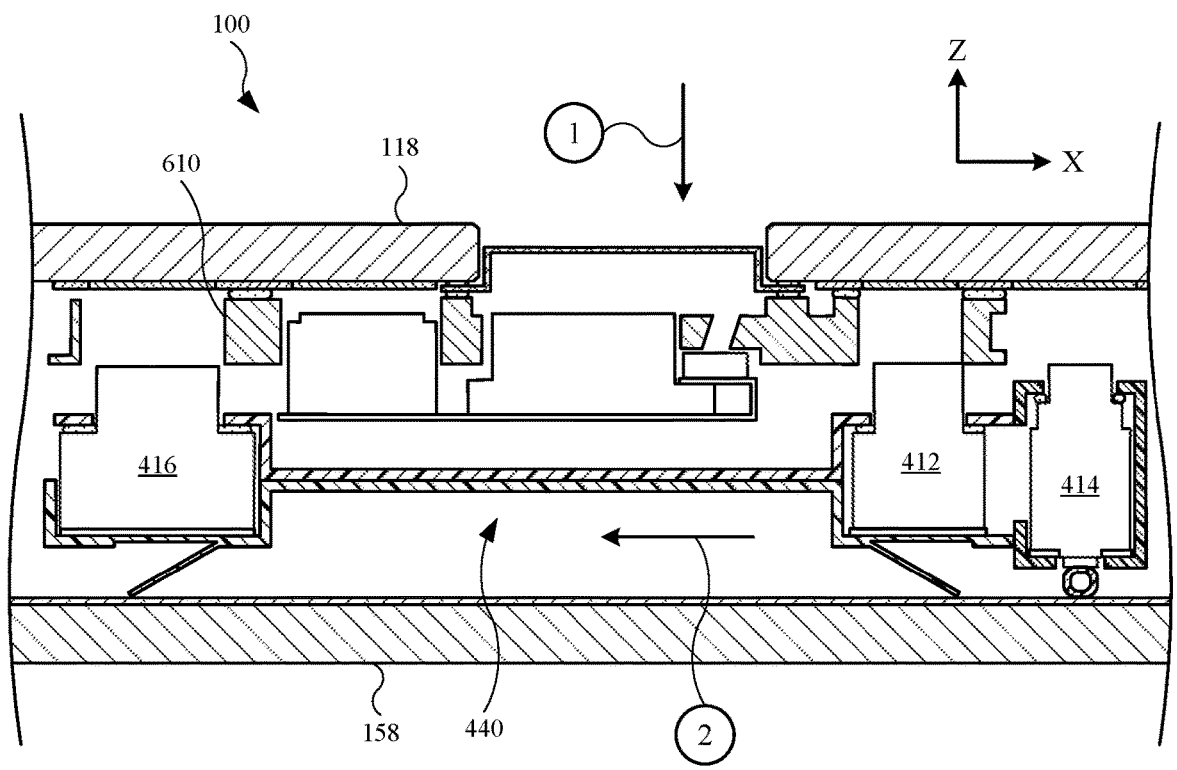
FIG. 14 illustrates a cross sectional view that partially shows the electronic device shown in FIG. 12, with the alignment module engaging the vision system and providing a force that moves the vision system and the bracket assembly.

FIG. 14 illustrates a cross sectional view that partially shows the electronic device 100 shown in FIG. 12, with the alignment module 610 engaging the vision system 410 and providing a force that moves the vision system 410 and the bracket assembly 440. As shown in Step 1, the protective cover 118 moves in a direction toward the protective cover 158 in order to secure the protective cover 118 to the band 102 (shown in FIG. 13). As the protective cover 118 is moved toward the protective cover 158, the alignment module 610 may engage a module of the vision system 410 (labeled in FIG. 12). For example, as shown in FIG. 14, the alignment module 610 engages the first camera module 412. As shown in Step 2, the force provided by the alignment module 610 engaging the first camera module 412 (by way of the protective cover 118 moving toward the protective cover 158) causes the first camera module 412 to shift along the X-axis, which in turn causes the bracket assembly 440 and the remaining modules to shift in the X-axis. The shifting, or movement, of the modules causes the modules to align in the electronic device 100 in a desired manner. This will be shown below. In this manner, the first camera module 412 may be referred to as an alignment feature in that the alignment module 610 uses the first camera module 412 to align all of the modules that are carried by the bracket assembly 440. However, in some embodiments (not shown), the alignment module 610 engages a different module of the bracket assembly 440. Also, it should be noted that despite the movement or shifting of the modules, the bracket assembly 440 maintains the spacing between i) the first camera module 412 and the second camera module 416, ii) light emitting module 414 and the second camera module 416, and iii) the first camera module 412 and the light emitting module 414.

While Step 2 shows the bracket assembly 440 and the modules being shifted along a particular direction, the bracket assembly 440 and the modules may shift in a different direction based the original position of the bracket assembly 440 and the modules in the electronic device 100. For example, when the alignment module 610 engages a different location of the first camera module 412 (as opposite the location shown in FIG. 14), the bracket assembly 440 and the modules may shift in the opposite direction along the X-axis in order to align the modules in the electronic device 100. Further, although not shown, the engagement between the alignment module 610 and the first camera module 412 may provide a force that causes the bracket assembly 440 and the modules to move in a direction perpendicular to the X-Z plane, such as along a "Y-axis" (not labeled) that is into and out of the page. The engagement between the alignment module 610 and the first camera module 412 (or any of the modules of the vision system 410) may provide a force that causes the bracket assembly 440 and the modules to move in two directions, such as along the X-axis as well as a direction perpendicular to the X-Z plane. Accordingly, in order to properly align the modules, the alignment module 610 may provide a force that moves the modules along two different axes.

Figure 15:
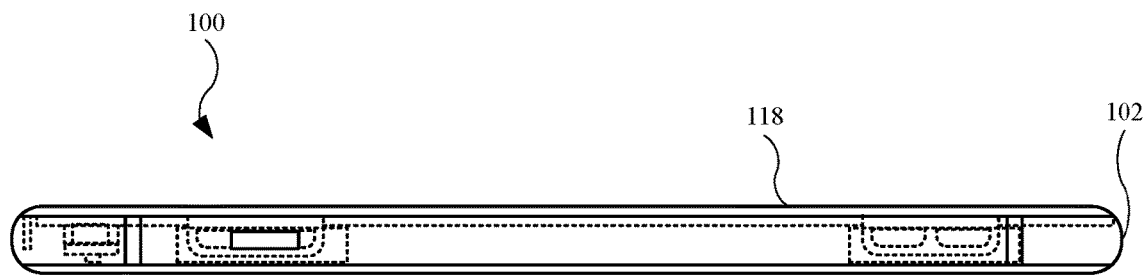
FIG. 15 illustrates aside view of the electronic device shown in FIG. 13, showing an assembled configuration of the electronic device.

FIG. 15 illustrates aside view of the electronic device 100 shown in FIG. 13, showing an assembled configuration of the electronic device 100. As shown, the protective cover 118 is coupled with the band 102, and the rails (labeled in FIG. 10) engage with and secure to their respective rail clips (shown in FIG. 7).

Figure 16:
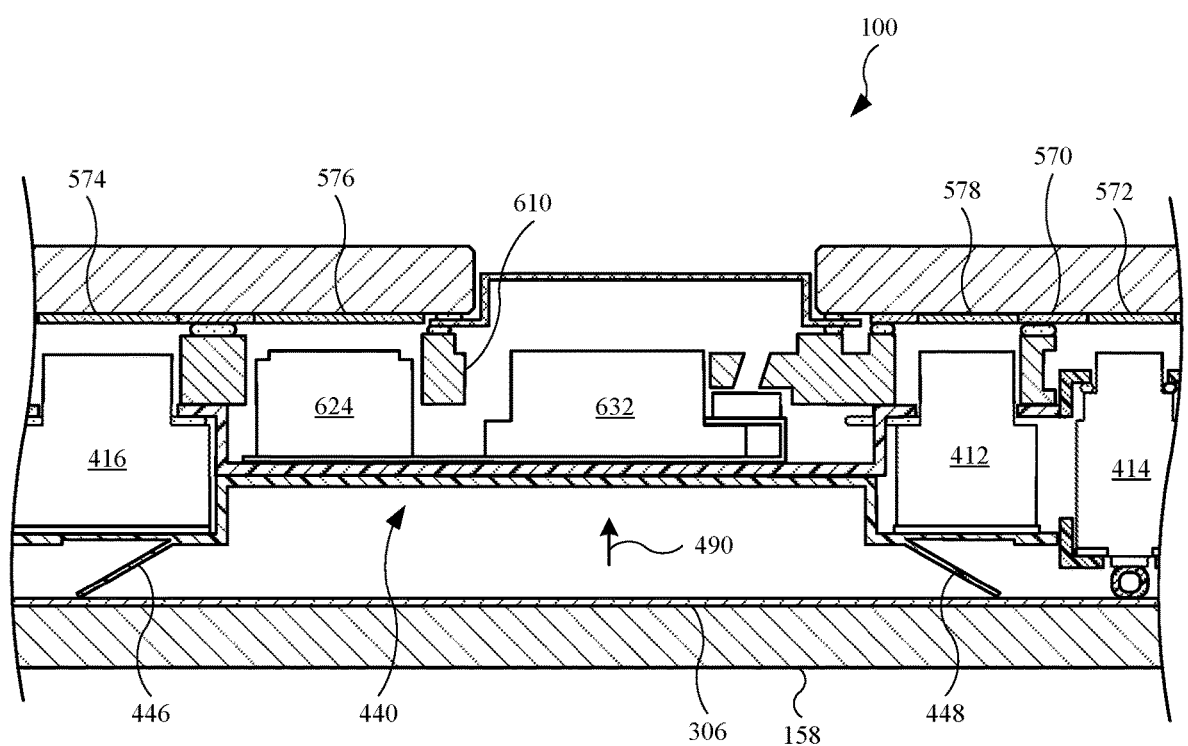
FIG. 16 illustrates a cross sectional view that partially shows the electronic device shown in FIG. 14, further showing the vision system aligned in the electronic device.

FIG. 16 illustrates a cross sectional view that partially shows the electronic device 100 shown in FIG. 14, further showing the modules of vision system 410 (labeled in FIG. 12) aligned in the electronic device 100. The modules of the vision system 410 are aligned in the electronic device 100 subsequent to the alignment module 610 causing the modules of the vision system 410 and the bracket assembly 440 to shift along at least one axis. Further, when the modules of the vision system 410 are aligned in the electronic device 100, the modules of the vision system 410 are aligned with their respective light filter. For example, the first camera module 412 is aligned with the layer 578 disposed in an opening (not labeled) of the masking layer 570. The term "aligned" refers to the layer 578 being positioned over the first camera module 412 such that the masking layer 570 does not block the line of view for the first camera module 412. The layer 578, as previously described, is capable of passing visible light while blocking other forms of light (such as IR light). Also, although not shown in FIG. 16, the ambient light sensor 626 (shown in FIG. 10) is aligned with the layer 582 disposed in an opening (not labeled) of the masking layer 570. The layer 582, as previously described, is capable of passing visible light while blocking other forms of light (such as IR light).

Also, the light emitting module 414 is aligned with the layer 572 disposed in an opening (not labeled) of the masking layer 570, and the second camera module 416 is aligned with the layer 574 disposed in an opening (not labeled) of the masking layer 570. The layer 572 and the 574, as previously described, are capable of passing IR light while blocking other forms of light (such as visible light). Also, the light module 624, when positioned in the alignment module 610, is aligned with the layer 576 disposed in an opening (not labeled) of the masking layer 570. The layer 576, as previously described, is capable of transmitting IR light while blocking other forms of light (such as visible light). As a result, the masking layer 570 may substantially hide or obscure the modules of the vision system 410 as well as the bracket assembly 440, while the openings of masking layer 570 are filled with layers designed to transmit certain frequencies of light and block others, thereby allowing the components of the vision system 410 to properly transmit/emit or receive light.

Also, the first spring element 446 and the second spring element 448 may flex in response to compression forces from the protective cover 118 and the chassis 306 (or a combination of the protective cover 158 and the chassis 306). However, the first spring element 446 and the second spring element 448 may provide a biasing force, or counterforce, in a direction of an arrow 490. The biasing force may increase the engagement force between the bracket assembly 440 and the alignment module 610. As a result, the bracket assembly 440 may be held in place without the direct use of fasteners, adhesives, clips, etc., that would permanently fasten the bracket assembly 440 to any structural component of the electronic device 100. Furthermore, although an external force or load force exerted on the electronic device 100 may cause relative movement of the bracket assembly 440, the bracket assembly 440 can maintain a constant separation distance between the first camera module 412, the light emitting module 414, and the second camera module 416. This ensures the components of the vision system 410 remain at a fixed and predetermined distance from each other, and the vision system 410 can continue to function properly to obtain object recognition information without a re-calibration operation. Accordingly, any movement of the bracket assembly 440 may correspond to an equal amount of movement of the first camera module 412, the light emitting module 414, and the second camera module 416 such that there is no relative movement between these modules. Furthermore, due in part to the isolation or separation of the vision system 410 from the protective cover 158 and the chassis 306, a force to the protective cover 158 that causes the protective cover 158 and/or the chassis 306 to bend, warp, or otherwise become altered may result in the further compression of the first spring element 446 and/or the second spring element 448 without i) affecting the fixed distance between the components of the vision system 410, and ii) without causing mechanical contact between components of the vision system 410 and the chassis 306. As a result, the vision system 410 may continue to function properly despite external forces causing alterations to the electronic device 100.

Figure 17:
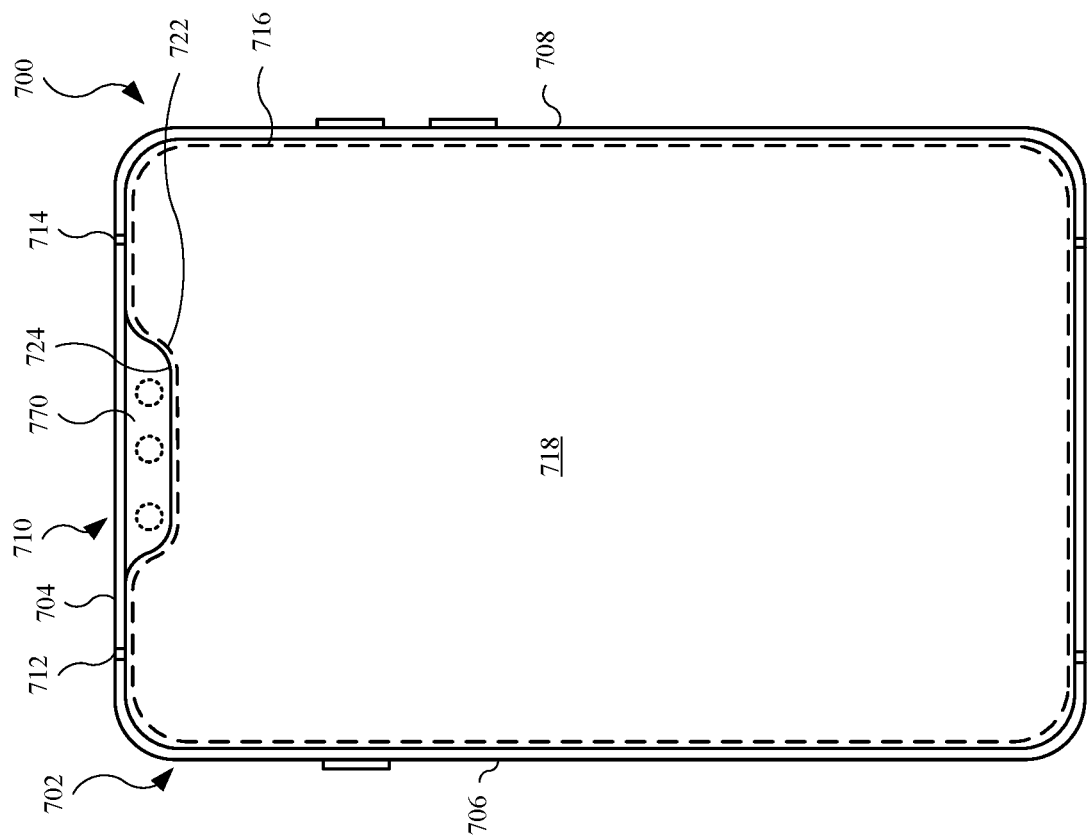
FIG. 17 illustrates a plan view of an alternate embodiment of an electronic device, showing the electronic device including a protective cover that covers a display assembly, with the protective cover including a notch and the display assembly including a notch, in accordance with some described embodiments.

FIG. 17 illustrates a plan view of an alternate embodiment of an electronic device 700, showing the electronic device 700 including a protective cover 718 that covers a display assembly 716, with the protective cover 718 including a notch 724 and the display assembly 716 including a notch 722, in accordance with some described embodiments. The electronic device 700 may include features and components described herein for an electronic device. The aforementioned notches are aligned with one another, and are in a location corresponding to a vision system. As shown, the vision system 710 is not directly covered by the protective cover 718, but may be at least partially hidden by a masking layer 770. Accordingly, the masking layer 770 may be separate from the protective cover 718, thereby reducing the required alignment steps between the masking layer 770 and the vision system 710. Also, the band 702 can be split into its sidewall components in different locations. For example, a first sidewall component 704 of the band 702 is separated from a second sidewall component 706 and a third sidewall component 708 (both of the band 702) by a first composite material 712 and a second composite material 714, respectively. The first composite material 712 and the second composite material 714 are located along different locations of the electronic device 700, as compared to the first composite material 112 and the second composite material 114 (shown in FIG. 1).

Figure 18:
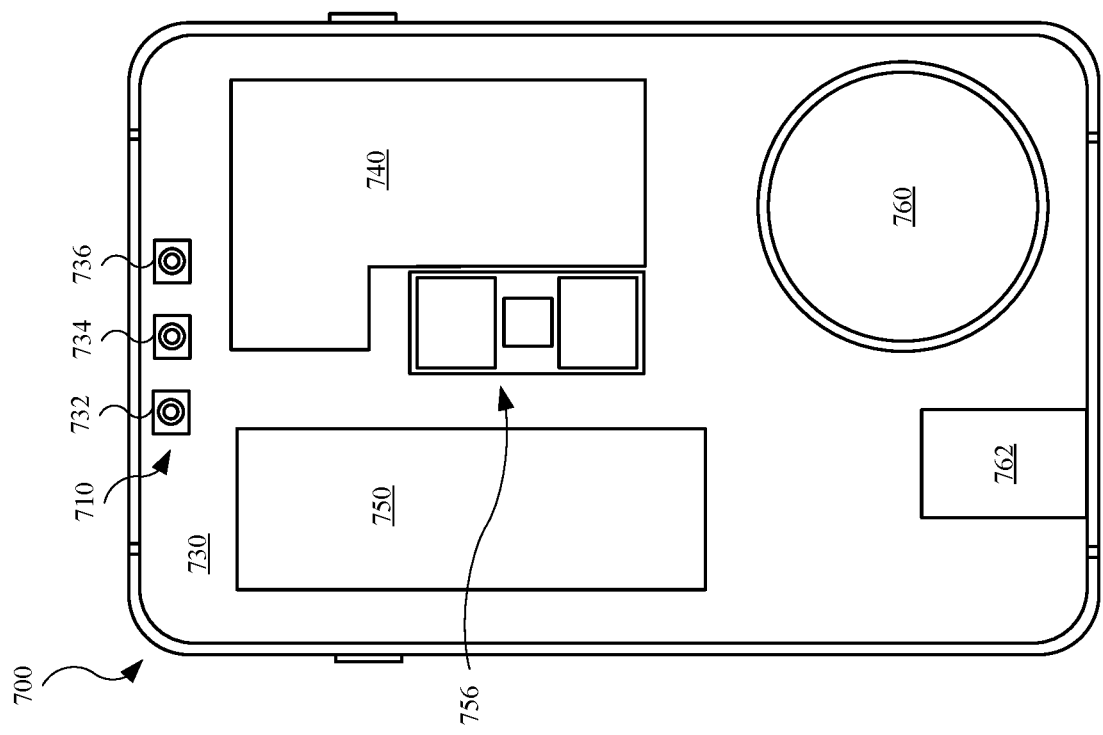
FIG. 18 illustrates a plan view of the electronic device shown in FIG. 17, with the display assembly and the protective cover removed.

FIG. 18 illustrates a plan view of the electronic device 700 shown in FIG. 17, with the display assembly and the protective cover removed. The electronic device 700 may include a chassis 730 that provides structural and electrical grounding support. As shown, the vision system 710 may include a first camera module 732, a light emitting module 734, and a second camera module 736. However, as compared to the vision system 410 (shown in FIG. 8), the vision system 710 in FIG. 18 may include a "modular" design that includes individual modules not held by a bracket assembly and secured by other means. Also, the electronic device 700 may include a battery assembly 740 and a circuit board assembly 750 that combine to surround a camera assembly 756. As shown, the camera assembly 756 may be centrally located in a location corresponding to an opening (not labeled) of the chassis 730. Also, the electronic device 700 may further include a wireless charging system 760 located along a corner of the electronic device 700, in a location corresponding to an additional opening (not labeled) of the chassis 730. The electronic device 700 may further include an audio module 762.

Figure 19:
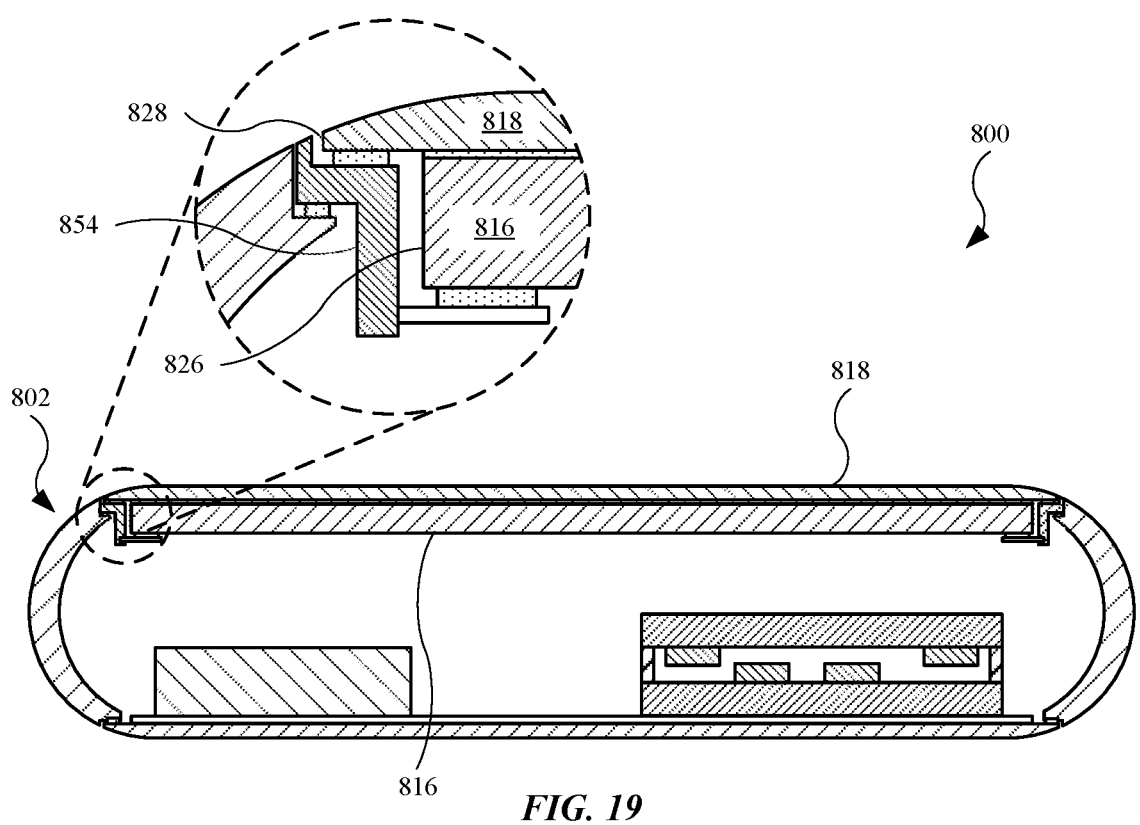
FIG. 19 illustrates a cross sectional view of an alternate embodiment of an electronic device that includes a protective cover that covers a display assembly, showing the display assembly extending substantially to the edges of the protective cover, in accordance with some described embodiments.
Figure 20:
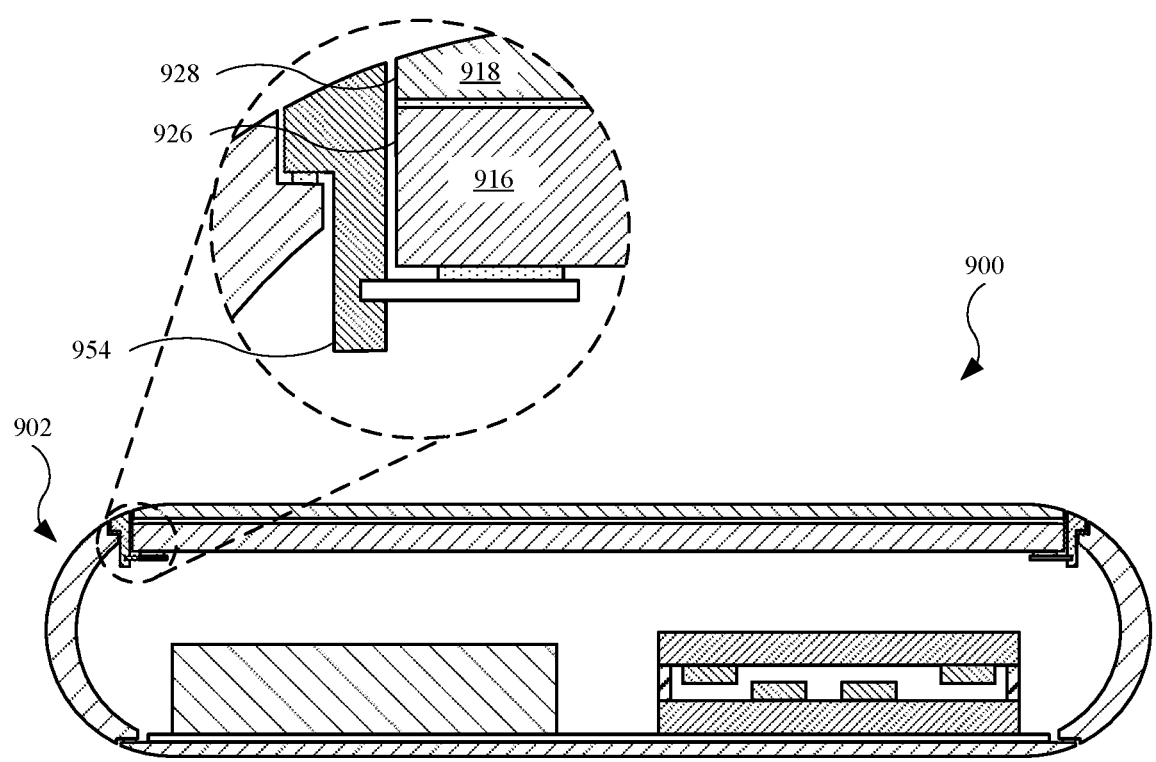
FIG. 20 illustrates a cross sectional view of an alternate embodiment of an electronic device that includes a protective cover that covers a display assembly, showing the display assembly extending to the edges of the protective cover, in accordance with some described embodiments.

Electronic devices described herein may vary the position/location of a display assembly with respect to a protective cover. For example, a display assembly may extend substantially (such as 1 millimeter or less) to an edge, or multiple edges, of a protective cover. In another example, a display assembly may extend to an edge, or multiple edges, of a protective cover such that the display assembly and the protective cover share an outer perimeter or outer edge. In other words, the display assembly and the protective cover may include the same size in at least two dimensions. FIGS. 19 and 20 illustrate various embodiments of electronic devices illustrating the location of the display assembly with respect to the protective cover. It should be noted that electronic devices shown and described in FIGS. 19 and 20 may include features described herein for an electronic device.

FIG. 19 illustrates a cross sectional view of an alternate embodiment of an electronic device 800 that includes a protective cover 818 that covers a display assembly 816, showing the display assembly 816 extending substantially to the edges of the protective cover 818, in accordance with some described embodiments. As shown in the enlarged view, the electronic device 800 includes a frame 854 that carries the protective cover 818 and the display assembly 816, which is adhesively secured to the protective cover 818. Also, the frame 854 is adhesively secured with the protective cover 818 and a band 802 of the electronic device 800. The display assembly 816 includes an edge 826 that extends substantially to an edge 828 of the protective cover 818. It should be noted that the relationship between the edge 826 of the display assembly 816 and the edge 828 of the protective cover 818 may apply in multiple locations.

In some instances, the frame can be modified to alter the relationship between the display assembly and the protective cover. For example, FIG. 20 illustrates a cross sectional view of an alternate embodiment of an electronic device 900 that includes a protective cover 918 that covers a display assembly 916, showing the display assembly 916 extending to the edges of the protective cover 918, in accordance with some described embodiments. As shown in the enlarged view, the electronic device 900 includes a frame 954 that carries the protective cover 918 and the display assembly 916, which is adhesively secured to the protective cover 918. Also, the frame 954 is adhesively secured with the protective cover 918 and a band 902 of the electronic device 800. The display assembly 916 includes an edge 926 that is co-planar, or flush, with respect to an edge 928 of the protective cover 918, as the frame 954 is modified to be external (laterally) with respect to the display assembly 916 and the protective cover 918. It should be noted that the relationship between the edge 926 of the display assembly 916 and the edge 928 of the protective cover 918 may apply in multiple locations.

In some embodiments, an electronic device may include a display assembly that extends laterally over a band to define an outer edge of the electronic device. In other words, when viewing the electronic device from a plan view (that is, when looking down at the electronic device such that the electronic device is viewed in a X-Y plane), the display assembly extends laterally to at least to the dimensions of the band, and in some instances, extends laterally beyond the band. Accordingly, when the display assembly presents visual information, the visual information can be seen along the outer perimeter of the electronic device, due in part to the lateral dimensions of the display assembly. With the display assembly defining an outer edge, or outer perimeter, the electronic device may maximize the area with which visual information is provided to the user. Also, the electronic device may not include a border along the outer edge of the electronic device, as the display assembly can illuminate and present the visual information at the outer edge of the electronic device. It should be noted that the control inputs (buttons and switches, for example) may extend laterally beyond the display assembly, but other features (including the band) do not extend beyond the dimensions of the display assembly. Also, when the display assembly includes a notch that accommodates a vision system, the display assembly may not define the outer perimeter of the electronic device in a location corresponding to the notch.

Figure 21:
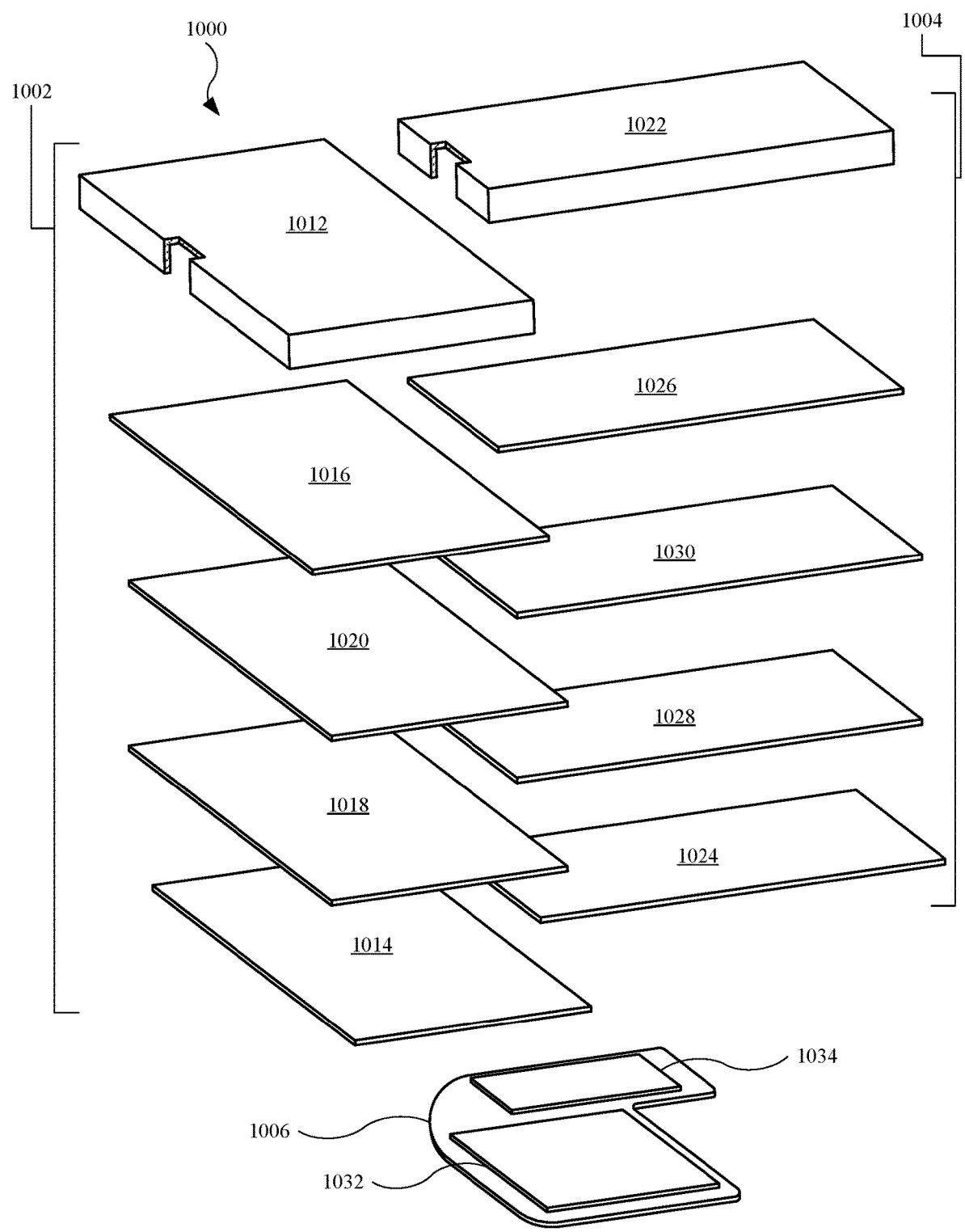
FIG. 21 illustrates an exploded view of an embodiment of a battery assembly, in accordance with some described embodiments.

FIG. 21 illustrates an exploded view of an embodiment of a battery assembly 1000, in accordance with some described embodiments. The battery assembly 1000 is designed for use as an internal power supply for electronic devices described herein. The battery assembly 1000 may include a rechargeable battery assembly that is charged and recharged by an external power supply using, for example, from the port 126 (shown in FIG. 1) receiving power from a cable connector, or a wireless charging system.

As shown, the battery assembly 1000 may include a first battery component 1002 and a second battery component 1004. The first battery component 1002 is in electrical communication with the second battery component 1004 when the battery assembly 1000 is assembled. The first battery component 1002 may include a first housing component 1012 and a second housing component 1014, with the first housing component 1012 sealed with the second housing component 1014 to form a housing. The housing may define a cavity to shield and enclose internal components, such as a first electrode 1016, a second electrode 1018, and a separator 1020. The separator 1020 provides at least some physical isolation between the first electrode 1016 and the second electrode 1018, while still allowing the flow of electrical charge between the first electrode 1016 and the second electrode 1018. As commonly known in the art for a battery, one of the first electrode 1016 and the second electrode 1018 includes an anode, while the remaining electrode (of the first electrode 1016 and the second electrode 1018) includes a cathode. Also, as commonly known, electrodes can be used to convert chemical energy into electricity for use by an electronic device (such as the electronic device 100, shown in FIG. 1).

The second battery component 1004 may include a first housing component 1022 and a second housing component 1024, with the first housing component 1022 sealed with the second housing component 1024 to form a housing. The housing may define a cavity to shield and enclose internal components, such as a first electrode 1026, a second electrode 1028, and a separator 1030. The separator 1030 provides at least some physical isolation between the first electrode 1026 and the second electrode 1028, while still allowing the flow of electrical charge between the first electrode 1026 and the second electrode 1028. As commonly known in the art for a battery, one of the first electrode 1026 and the second electrode 1028 includes an anode, while the remaining electrode (of the first electrode 1026 and the second electrode 1028) includes a cathode. Also, as commonly known, electrodes can be used to convert chemical energy into electricity for use by an electronic device (such as the electronic device 100, shown in FIG. 1).

Also, the first battery component 1002 may couple with the second battery component 1004 by a coupling member 1006. The coupling member 1006 may include a first adhesive material 1032 that adhesively secures the coupling member 1006 to the first battery component 1002 (in particular, the second housing component 1014 of the first battery component 1002), and a second adhesive material 1034 that adhesively secures the coupling member 1006 to the second battery component 1004 (in particular, the second housing component 1024 of the second battery component 1004). However, the coupling member 1006 may adhesively couple with the first battery component 1002 and the second battery component 1004 at the first housing component 1012 and the first housing component 1022, respectively.

The coupling member 1006 may act as a tensile shim that enhances structural stability of the battery assembly 1010. In this regard, the coupling member 1006 may provide support to the battery assembly 1010 in the event of tensile load across the battery assembly 1010, thereby preventing damage to the battery assembly 1000, as well as distributing shock load across regions of the battery assembly 1010. Also, in some instances, the coupling member 1006 may provide no support in the event of a compressive load force to the battery assembly 1010, which may be advantageous in unexpected impact events in which the battery assembly 1010 is subjected to an external load, as the relative motion of individual cells (that is, the electrodes in the first battery component 1002 and the second battery component 1004) may dissipate energy on impact. Further, the geometry of the coupling member 1006 over the electrodes can be designed to support or avoid specific regions of interest. Further, the first adhesive material 1032 and/or the second adhesive material 1034 may include a reworkable adhesive that allows for easy removal. Also, in order to provide targeted shock absorption, the coupling member 1006 may be used as a shear layer between the battery assembly 1010 and retention adhesives (discussed below) that secure the battery assembly 1000 with an electronic device (not shown in FIG. 21). Further, the coupling member 1006 may wrap around edges of the battery assembly 1010 to provide additional support.

Although not shown in FIG. 21, other methods for retention of a single-cell battery pack or a multi-cell soft-pack (similar to the battery assembly 1000) are available. For example, in some embodiments, a rigid external support structure can be used to retain a rigid geometry for a multiple-cell battery, causing it to behave as a single body. It can also be used to prevent or allow certain types of motion or flexibility as desired. In some embodiments, a rigid external support structure can directly fasten the battery to the housing. In some embodiments, a soft or sprung external support structure can bridge the battery and housing and be used to spread dynamic loads and reduce shock. In some embodiments, an adhesive may be used to directly bond multiple cells. Each embodiment is not necessarily exclusive of the others, and multiple embodiments may be used in concert.

Figure 22:
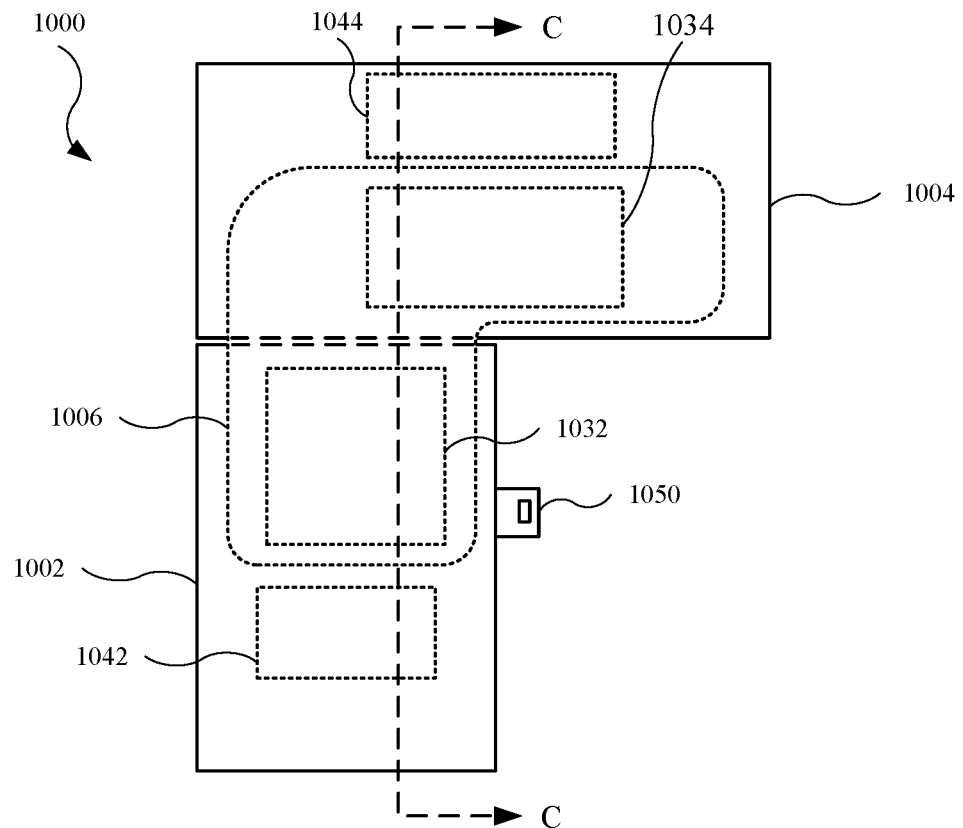
FIG. 22 illustrates a plan view of the battery assembly shown in FIG. 21, showing the first battery component coupled with the second battery component by the coupling member.

FIG. 22 illustrates a plan view of the battery assembly 1000 shown in FIG. 21, showing the first battery component 1002 coupled with the second battery component 1004 by the coupling member 1006. While traditional battery electrodes include a generally rectilinear shape, the electrodes in the battery assembly 1000, and battery assemblies described herein, may include different shapes. For example, the battery assembly 1000, when assembled, may resemble an "L-shaped configuration," that is, the shape of the letter L, in which the combination of the first battery component 1002 and the second battery component 1004 define six different parallel sides or surfaces. Although not shown, the battery assembly 1000 may further include a circuit board that includes one or more circuits designed to monitor electrical current flowing into and out of the battery assembly 1000. Also, the circuit board, as well as components of the circuit board, may be in electrical communication with a circuit board assembly (discussed below) of an electronic device.

FIG. 22 further shows the coupling member 1006 coupled with the first battery component 1002 and the second battery component 1004 using the first adhesive material 1032 and the second adhesive material 1034, respectively. In order to secure the battery assembly 1000 with an electronic device (such as the electronic device 100 shown in FIG. 1), the coupling member 1006 may secure with a third adhesive material 1042 and a fourth adhesive material 1044. The third adhesive material 1042 and the fourth adhesive material 1044 may secure with a structural component (such as the chassis 306 shown in FIG. 7). Also, in order to electrically couple the battery assembly with another component, the battery assembly 1000 may include a connector 1050.

Figure 23:
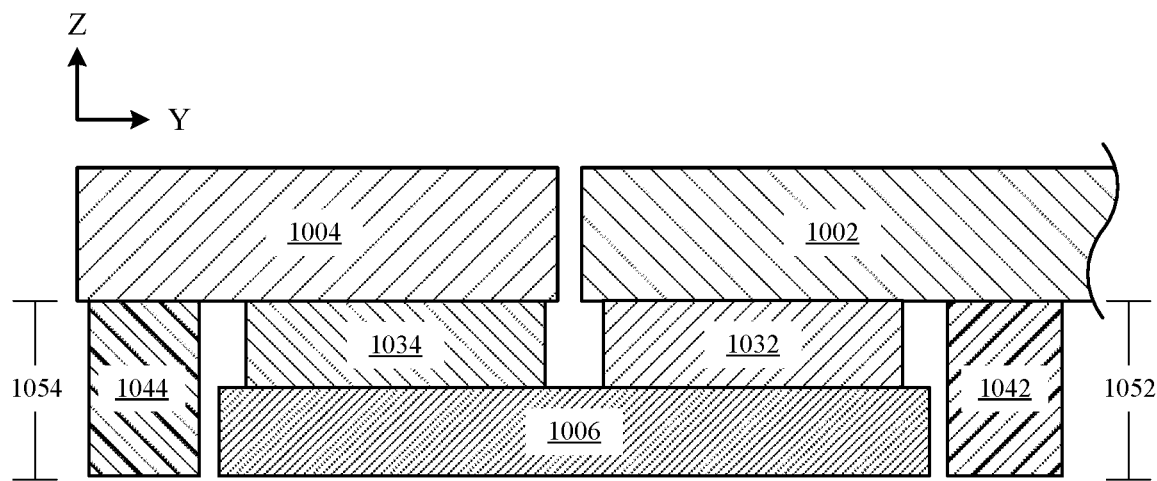
FIG. 23 illustrates a cross sectional view of the battery assembly shown in FIG. 22, taken along line C-C.

FIG. 23 illustrates a cross sectional view of the battery assembly shown in FIG. 22, taken along line C-C. As shown, the first adhesive material 1032 is positioned between the first battery component 1002 and the coupling member 1006, and the second adhesive material 1034 is positioned between the second battery component 1004 and the coupling member 1006. Although not shown in FIG. 23, the coupling member 1006, the first adhesive material 1032, and the second adhesive material 1034 may be rearranged such that the coupling member 1006, the first adhesive material 1032, and the second adhesive material 1034 lie above the first battery component 1002 and the second battery component 1004 in the Z-dimension.

Also, the third adhesive material 1042 may include a dimension 1052, or height, similar to a combined height of the first adhesive material 1032 and the coupling member 1006, and the fourth adhesive material 1044 may include a dimension 1054, or height, similar to a combined height of the second adhesive material 1034 and the coupling member 1006. Although not shown in FIG. 23, the dimension 1052 of the third adhesive material 1042 may be greater than the combined height of the first adhesive material 1032 and the coupling member 1006, and the dimension 1054 of the fourth adhesive material 1044 may be greater than the combined height of the second adhesive material 1034 and the coupling member 1006. In this regard, the third adhesive material 1042 may combine with the fourth adhesive material 1044 to suspend the first battery component 1002, the second battery component 1004, the first adhesive material 1032, and the second adhesive material 1034, such that these structural elements are not in contact with a component (such as the wireless power receiving module 160 shown in FIG. 7).

Figure 24:
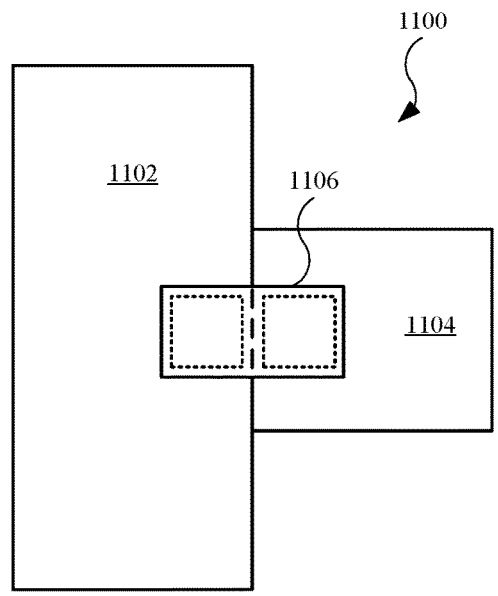
FIG. 24 illustrates a plan view of an alternate embodiment of a battery assembly, showing a first battery component coupled with a second battery component along a central location of the first battery component, in accordance with some described embodiments.
Figure 25:
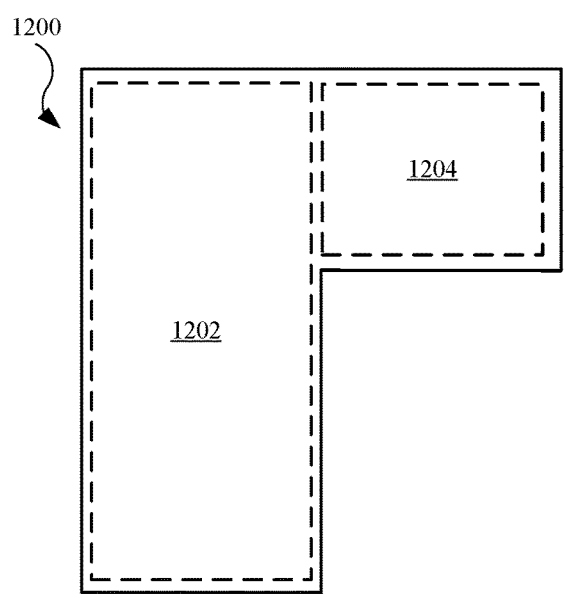
FIG. 25 illustrates a plan view of an alternate embodiment of a battery assembly, showing the battery assembly having a housing formed from a unitary body, in accordance with some described embodiments.
Figure 26:
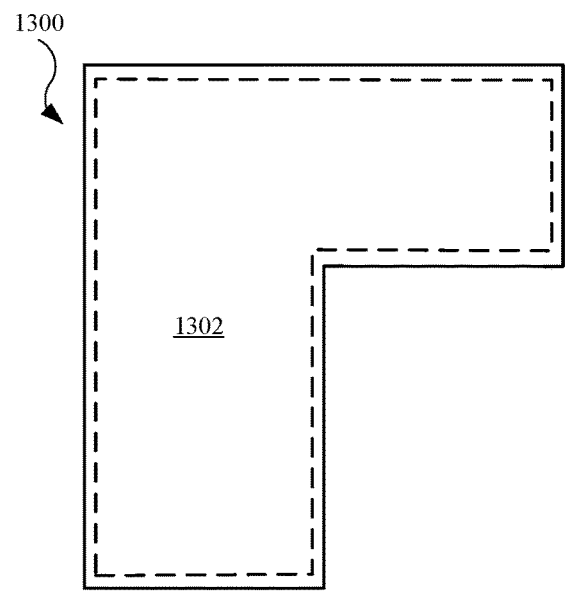
FIG. 26 illustrates a plan view of an alternate embodiment of a battery assembly, showing the battery assembly having a housing formed from a unitary body and a battery component positioned in the unitary housing, in accordance with some described embodiments.

FIGS. 24-26 illustrate various embodiments of a battery assembly that may be incorporated into an electronic device described herein. Also, the battery assemblies shown and described in FIGS. 24-26 may include at least some structures and features described herein for a battery assembly. FIG. 24 illustrates a plan view of an alternate embodiment of a battery assembly 1100, showing a first battery component 1102 coupled with a second battery component 1104 along a central location of the first battery component 1102, in accordance with some described embodiments. As shown, a coupling member 1106 can be used to secure the first battery component 1102 with the second battery component 1104. FIG. 24 exemplifies that the second battery component 1104 may be located in different positions relative to the first battery component 1102, and accordingly, the configuration, or shape, the battery assembly 1100 can take on several different configurations. In this regard, the battery assembly 1100 may be reconfigured to form different shapes in order to accommodate other internal component of an electronic device, and avoid engineering design changes to the layout of the internal components of the electronic device.

FIG. 25 illustrates a plan view of an alternate embodiment of a battery assembly 1200, showing the battery assembly 1200 having a housing formed from a unitary body, in accordance with some described embodiments. As shown, the battery assembly 1200 may include a first battery component 1202 and a second battery component 1204, both of which are housed in the unitary housing of the battery assembly 1200. This may reduce the total number of parts, thereby reducing manufacturing time of the battery assembly 1200.

FIG. 26 illustrates a plan view of an alternate embodiment of a battery assembly 1300, showing the battery assembly 1300 having a housing formed from a unitary body and a battery component 1302 positioned in the unitary housing, in accordance with some described embodiments. The battery component 1302 may take on a similar shape as that of the battery assembly 1300. Accordingly, the battery component 1302 may resemble an L-shape configuration.

Figure 27:
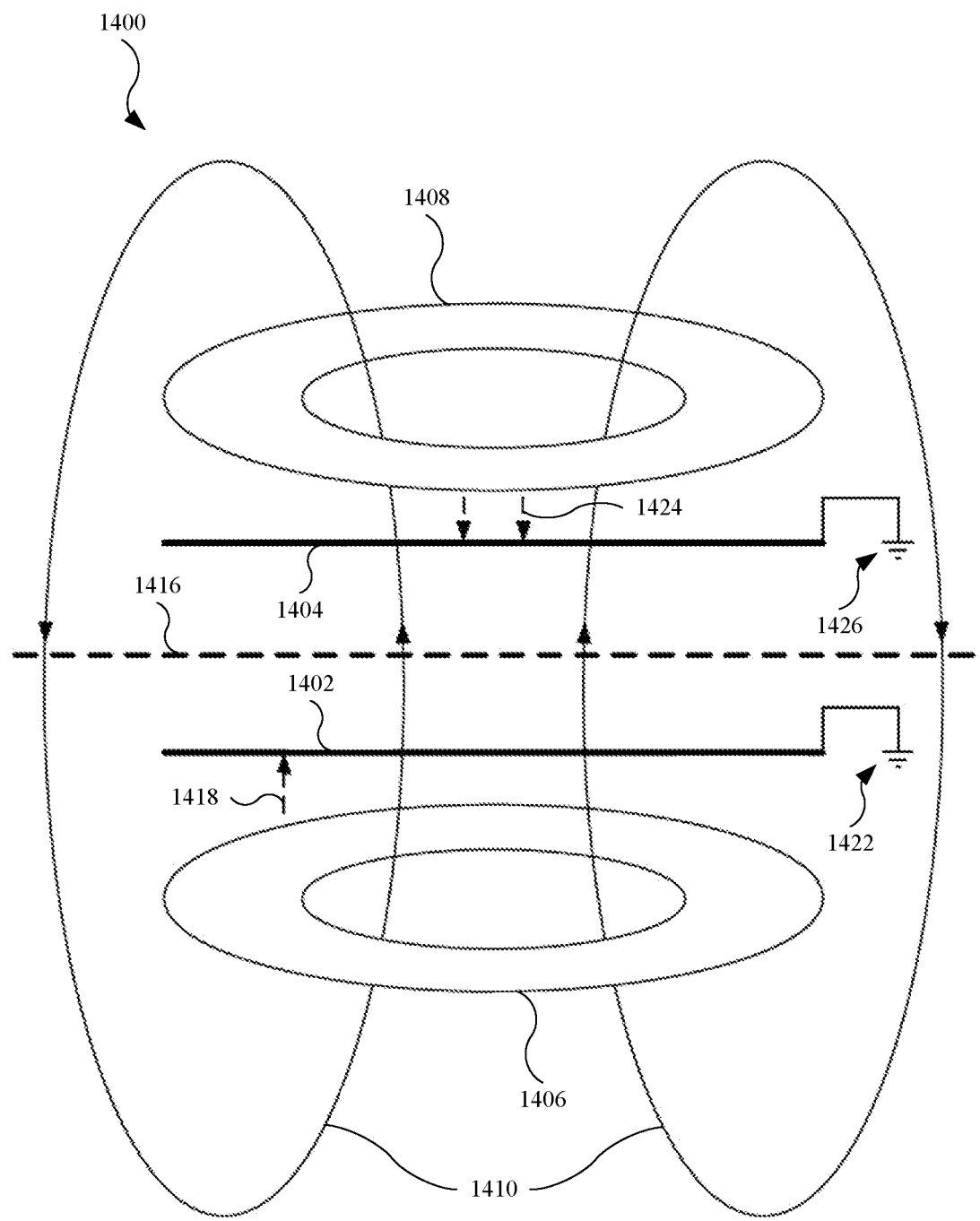
FIG. 27 illustrates a simplified diagram of a wireless charging system that includes a transmitter shield and a receiver shield, in accordance with some described embodiments.

FIG. 27 is a simplified diagram of a wireless charging system 1400 that includes a transmitter shield 1402 and a receiver shield 1404, in accordance with some described embodiments. The transmitter shield 1402 may be positioned in front of a transmitter coil 1406 so that magnetic flux 1410 is directed toward the transmitter shield 1402. For instance, the transmitter shield 1402 is positioned between a transmitter coil 1406 and a receiver coil 1408 during wireless power transfer so that the magnetic flux 1410 first passes through the transmitter shield 1402 before reaching the receiver coil 1408. In some embodiments, the transmitter shield 1402 can be positioned between the transmitter coil 1406 and an interface 1416 when an electronic device (such as the electronic device 100, shown in FIGS. 1 and 2) rests on a wireless charging device (not shown in FIG. 27) to perform wireless power transfer to the electronic device. The transmitter shield 1402 and the transmitter coil 1406 can both be positioned within the wireless charging device. The transmitter shield 1402 can be substantially transparent to the magnetic flux 1410 (meaning the transmitter shield 1402 provides minimal disruption of the magnetic flux 1410) so that the receiver coil 1408 receives a substantial percentage of the magnetic flux 1410 generated by the transmitter coil 1406.

While the transmitter shield 1402 can be substantially transparent to the magnetic flux 1410, the transmitter shield 1402 can, on the other hand, be substantially opaque to an electric field 1418 such that the transmitter shield 1402 substantially blocks the electric field 1418. This prevents electric field the 1418 from exposing on the receiver coil 1408 (that can be positioned in an electronic device) and generating a detrimental voltage on the receiver coil 1408. Due in part to the transmitter shield 1402 substantially blocking the electric field 1418 before the electric field 1418 can reach the receiver coil 1408, the electric field 1418 may generate voltage on the transmitter shield 1402 instead of the receiver coil 1408. The amount of voltage generated on the transmitter shield 1402 may correspond to the amount of voltage that would have been generated on the receiver coil 1408 had the transmitter shield 1402 not been present.

In some embodiments, voltage generated on the transmitter shield 1402 can be removed so that the voltage does not permanently remain on the transmitter shield 1402. As an example, voltage on the transmitter shield 1402 can be discharged to ground. Thus, transmitter shield 1402 can be coupled to a ground connection 1422 that allows voltage on the transmitter shield 1402 to be discharged to ground. The ground connection 1422 can be a ground ring or any other suitable conductive structure coupled to ground that can remove voltage from the transmitter shield 1402.

Similar to the transmitter shield 1402, the receiver shield 1404 may also be implemented in the wireless charging system 1400 to prevent detrimental voltage from being generated on the transmitter coil 1406 from an electric field 1424 generated by the receiver coil 1408. The receiver shield 1404 may be positioned in front of the receiver coil 1408 so that the magnetic flux 1410 first passes through the receiver shield 1404 before reaching the receiver coil 1408. In some embodiments, the receiver shield 1404 and the receiver coil 1408 are positioned within a wireless power receiving module, which in turn is positioned within an electronic device (such as the electronic device 100, shown in FIGS. 1 and 2). Within the wireless power receiving module, the receiver shield 1404 can be positioned between the interface 1416 and the receiver coil 1408 when the electronic device rests on a wireless charging device to perform wireless power transfer.

Similar to the transmitter shield 1402, the receiver shield 1404 can be substantially transparent to the magnetic flux 1410 so that a substantial percentage of the magnetic flux 1410 generated by the transmitter coil 1406 passes through the receiver shield 1404 and is received by the receiver coil 1408, while the receiver shield 1404 can be substantially opaque to the electric field 1424 such that the receiver shield 1404 substantially blocks the electric field 1424. This prevents the electric field 1424 from reaching the transmitter coil 1406 and generating a detrimental voltage on the transmitter coil 1406 while enabling wireless power transfer. Like the transmitter shield 1402, the receiver shield 1404 may also be grounded so that voltage generated by the electric field 1424 may be discharged to a ground connection 1426. The ground connection 1426 may be a structure similar to the ground connection 1422 in some embodiments, or it may be the same structure as the ground connection 1422 in other embodiments.

By incorporating the transmitter shield 1402 and the receiver shield 1404 into the wireless charging system 1400, the wireless charging device and the electronic device within which the transmitter shield 1402 and the receiver shield 1404 are implemented, respectively, are exposing their grounds to each other. This mutes any ground noise caused by the electrical interactions between the transmitter coil 1406 and the receiver coil 1408. As can be appreciated by disclosures herein, the transmitter shield 1402 and the receiver shield 1404 are shielding structures that are able to block the passage of electric fields, yet allow the passage of magnetic flux. Also, in some embodiments, a transmitter shield can be included in a wireless charging device, such as a wireless charging mat, and a receiver shield can be included within a wireless power receiving module included within a portable electronic device configured to rest on the wireless charging device to wirelessly receiver power from the wireless charging mat.

Figure 28:
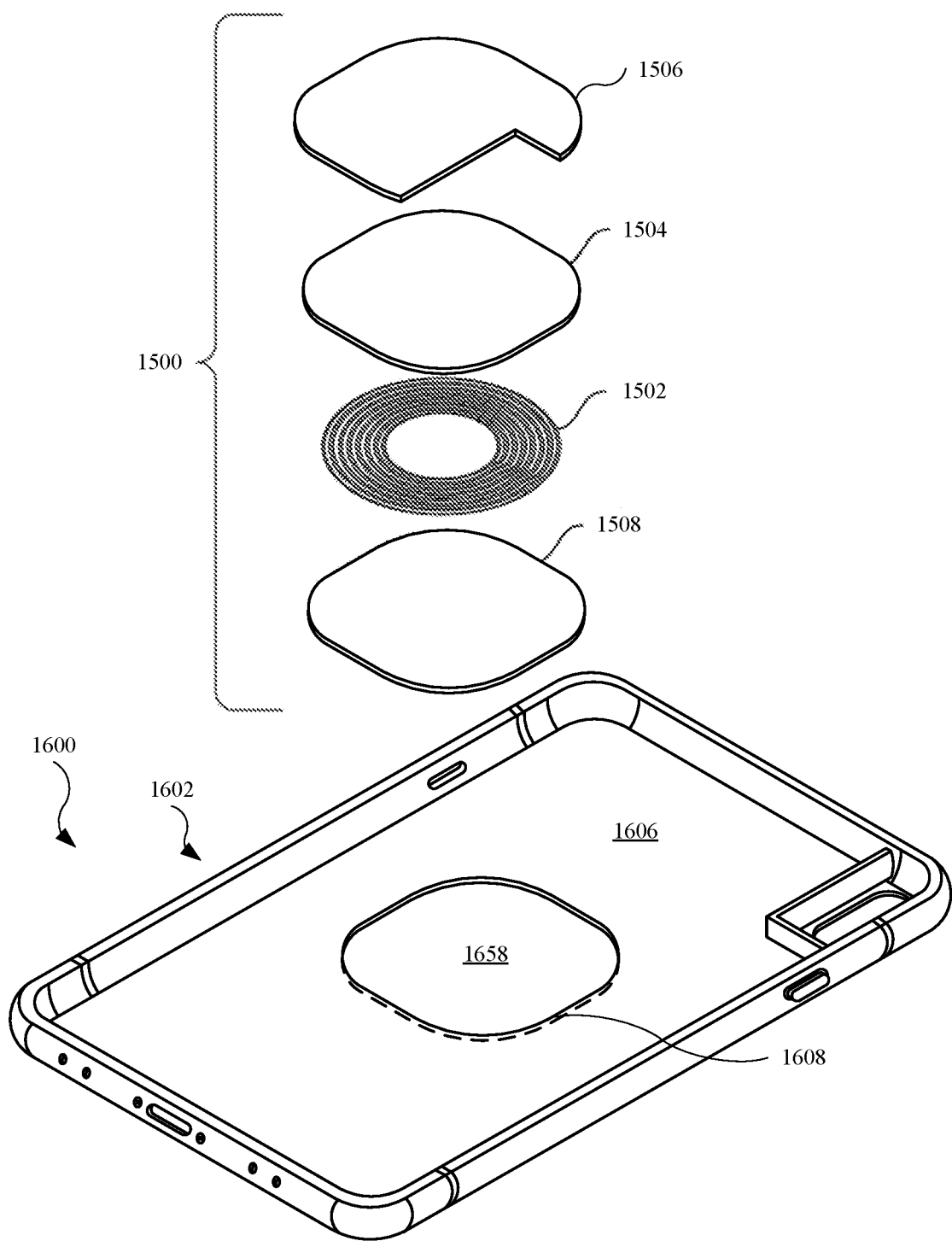
FIG. 28 illustrates an exploded view of a wireless power receiving module that can be incorporated into an electronic device to receive power by magnetic induction.

FIG. 28 illustrates an exploded view of a wireless power receiving module 1500 that can be incorporated into an electronic device 1600 to receive power by magnetic induction, in accordance with some described embodiments. For purposes of simplicity, several components of the electronic device 1600 are removed. However, the electronic device 1600 may include any features described herein for an electronic device. Also, the housing may include a band 1602 and a protective cover 1658. The band 1602 and the protective cover 1658 may include any material previously described for a band and a protective cover, respectively. For example, the band 1602 may include a material, such as stainless steel or aluminum, as non-limiting examples, and the protective cover 1658 may include a non-metal, such as glass, as a non-limiting example. Also, the electronic device 1600 may further include a chassis 1606 formed from a metal. However, the chassis 1606 may include an opening 1608 defining a through hole in the chassis 1606. The protective cover 1658 may cover the opening 1608.

The wireless power receiving module 1500 may be incorporated with the electronic device 1600 in order to receive, and subsequently provide, electrical energy to a battery assembly (not shown in FIG. 28). Also, the wireless power receiving module 1500 may be positioned in the opening 1608 of the chassis 1606. Accordingly, the opening 1608 may include a size and shape to receive the wireless power receiving module 1500. Also, the wireless power receiving module 1500 can include several separate shields. For example, the wireless power receiving module 1500 may include an integrated coil and electromagnetic shield 1502, a ferrite shield 1504, and a thermal shield 1506. Also, an adhesive component 1508 may attach the wireless power receiving module 1500 to the protective cover 1658. Although not shown, an additional non-metal structural element may be positioned between the protective cover 1658 and the wireless power receiving module 1500.

The integrated coil and electromagnetic shield 1502 can act as, for example, a receiver coil and a receiver shield, similar to the receiver coil 1408 and the receiver shield 1404 (shown in FIG. 27). In this manner, the integrated coil and electromagnetic shield 1502 may enable the wireless power receiving module 1500 to wirelessly receive power transmitted from a wireless power transmitting coil, such as the transmitter coil 1406 (shown in FIG. 27). When positioned within the electronic device 1600, the receiver shield portion of the integrated coil and electromagnetic shield 1502 may be positioned between the receiver coil portion and the charging surface of the electronic device 1600 (which may be defined in part by the protective cover 1658). Thus, the receiver shield is positioned between the receiver coil and the transmitter coil and serves to prevent capacitive coupling to the transmitter coil in a wireless charging device (not shown in FIG. 28) used to induce a current to the wireless power receiving module 1500. The ferrite shield 1504 acts as a magnetic field shield, or B-field shield, that redirects magnetic flux to increase coupling to the transmitter coil resulting in improved charging efficiency and helping prevent magnetic flux interference. The thermal shield 1506 can include a graphite or similar layer that provides thermal isolation between wireless power receiving module 1500 and the battery (not shown in FIG. 28), as well as other components of the electronic device in which the wireless power receiving module 1500 is incorporated. The thermal shield 1506 can also include a copper layer that is tied to an electrical ground and contributes to the thermal shielding while also capturing stray flux.

Although not shown, some embodiments of portable electronic devices may include a circuit board assembly that includes a first circuit board and a second circuit board. In some embodiments, each of the first circuit board and the second circuit board includes a printed circuit board. The first circuit board may be secured with, and positioned over, the second circuit board in a stacked configuration. Also, the first circuit board can include a size and shape that is the same as, or at least substantially similar to, the size and shape of the second circuit board. However, in some embodiments, the first circuit board includes at least some differences, as compared to the second circuit board, with regard to size and/or shape. While the stacked configuration of the circuit board assembly increases the footprint of the circuit board assembly in an electronic device (such as the electronic device 100 shown in FIG. 1) in one dimension, the stacked configuration decreases the footprint of the circuit board assembly in other dimensions. This additional space provided by stacking the aforementioned circuit boards may provide additional space in an electronic device for other components, such as the battery assembly 1000 (shown in FIG. 21).

The first circuit board and/or the second circuit board may include several operational components. An "operational component" may refer to an integrated circuit or processor circuit that performs an operation (or operations) such as executing instructions from a software application that is stored on a memory circuit, as non-limiting examples. An operational component may also refer to a transistor. The circuit boards may include operational components on multiple surfaces. For example, the first circuit board may include a first mounting surface and a second mounting surface opposite the first mounting surface, with the first mounting surface having a first operational component and the second mounting surface having a second operational component. Both the first mounting surface and the second mounting surface may include additional operational components. Also, it should be noted that the operational components on the first circuit board are in electrical communication with each other. The communication means may include, for example, at least one via that extends through the first circuit board.

The second circuit board may include a first mounting surface that includes several operational components, such as an operational component. The second circuit board also includes a second mounting surface opposite the first mounting surface. The second mounting surface of the second circuit board may also include operational components. In some embodiments, the second mounting surface includes an operational component (or components) in electrical communication with the operational components located on the first mounting surface. Also, it should be noted that when the circuit board assembly is assembled, the second circuit board is overlaid (or covered) by the first circuit board in the stacked configuration. However, it should be noted that the first circuit board is still separated from the second circuit board by at least some gap or space. Also, when the circuit board assembly is assembled, the first mounting surface of the second circuit board is facing the second mounting surface of the first circuit board, and vice versa.

The first circuit board may mechanically connect with the second circuit board by several standoffs connected with rivets. The standoffs are designed to not only provide mechanical connections, but also to maintain a desired distance between the first circuit board and the second circuit board such that components on the second mounting surface of the first circuit board do not interfere (physically) with components on the first mounting surface of the second circuit board, and vice versa. Also, the positioning of the standoffs and the rivets may be reversed such that the first circuit board includes the standoffs and the second circuit board includes the rivets.

In order to electrically couple the first circuit board with the second circuit board, several interposers may be used to route electrical signals between the first circuit board and the second circuit board. For example, the first circuit board may include several interposers electrically coupled with the second circuit board by, for example, a soldering operation. Also, the first circuit board and the second circuit board may include several metal traces that electrically couple the interposers with one or more operational components on the second circuit board. Also, when the first circuit board is electrically coupled to the second circuit board, each of the interposers may electrically couple with one or more metal traces on the second mounting surface of the first circuit board, and the first mounting surface of the second circuit board.

The circuit board assembly may include several shielding elements that shield the components of the circuit board assembly from electromagnetic interference ("EMI"). For example, the circuit board assembly may include a first shielding element that covers components located on the first mounting surface of the first circuit board. The first shielding element may include a metal-based material designed to provide an EMI shield to the components on the first mounting surface. The circuit board assembly may further include a second shielding element designed to provide an EMI shield for components located on the second mounting surface of the first circuit board and the first mounting surface of the second circuit board. The second shielding element may include a metal, such as copper or brass. The second shielding element may secure with (and between) the first circuit board and the second circuit board by several solder joints disposed on each circuit board. The first circuit board may also include solder joints in locations corresponding to locations of the solder joints on the second circuit board. In some embodiments, the second shielding element includes several discontinuous structural elements. In other embodiment, the second shielding element may include a single, continuous structural component designed to extend along an outer perimeter of the circuit board assembly. Alternatively, the second shielding element may include several shielding element parts that combine with one another to form the second shielding element.

The circuit board assembly may further include a third shielding element positioned on the second mounting surface of the second circuit board. The third shielding element may include a metal-based material designed to provide an EMI shield to the components on the second mounting surface of the second circuit board. Also, the third shielding element is designed to combine with the first shielding element and the second shielding element to provide an EMI shield to the circuit board assembly. Also, the second mounting surface of the second circuit board may include metal traces (throughout the second mounting surface). In this regard, in addition to forming an EMI shield, the third shielding element may define at least part of an electrical ground path for the circuit board assembly, as the third shielding element is electrically connected to the second mounting surface by way of the metal traces. Also, when the component (or components) of the circuit board assembly generates EMI during operation, the aforementioned shielding elements may shield components of an electronic device (such as the electronic device 100 shown in FIG. 1) that are external with respect to the circuit board assembly from EMI generated by the component(s) of the circuit board assembly.

Figure 29:
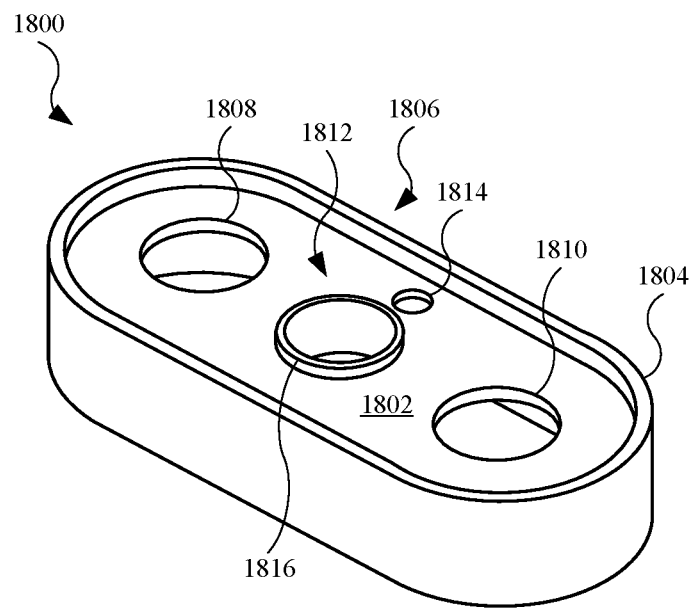
FIG. 29 illustrates an isometric view of an embodiment of a trim designed for a use with a camera assembly in an electronic device described herein, in accordance with some described embodiments.

FIG. 29 illustrates an isometric view of an embodiment of a trim 1800 designed for a use with a camera assembly in an electronic device described herein, in accordance with some described embodiments. The trim 1800 can include a surface 1802 and a first lip 1804 that extends from the surface 1802 to define a receptacle 1806. The trim 1800 may include a first opening 1808 and a second opening 1810 formed as through holes in the surface 1802, with the first opening 1808 and the second opening 1810 providing access for camera modules (not shown in FIG. 29) that can be enclosed by the trim 1800. The trim 1800 may further include a third opening 1812 formed as a through hole in the surface 1802 at a location between the first opening 1808 and the second opening 1810. The third opening 1812 that can provide access to a light emitter (not shown in FIG. 29), such as a strobe module designed to provide additional lighting during an image capture event by the aforementioned camera modules. The trim 1800 may additionally include a fourth opening 1814 formed as a through hole in the surface 1802 that can serve as an inlet opening for an audio transducer (not shown in FIG. 29). The trim 1800 may further include a second lip 1816 that extends from the surface 1802, and along a perimeter of the third opening 1812. As shown in FIG. 29, the surface 1802 can be recessed with respect to the first lip 1804 and the second lip 1816. The first lip 1804 can cooperate with the second lip 1816 to define the receptacle 1806. The receptacle 1806 may include a shape that is complementary to a camera cover glass (not shown in FIG. 29) so that the receptacle 1806 can receive the camera cover glass. The height of first lip 1804 and the second lip 1816 can be generally equal to the thickness/height of a camera cover glass. Hence, when a camera cover glass is placed on the surface 1802, a surface (parallel to the surface 1802) of the first lip 1804 and the second lip 1816 can be exposed and be flush with the exterior surface of camera cover glass. The exposed surfaces of the first lip 1804 and the second lip 1816 can serve as cosmetic surfaces.

Figure 30:
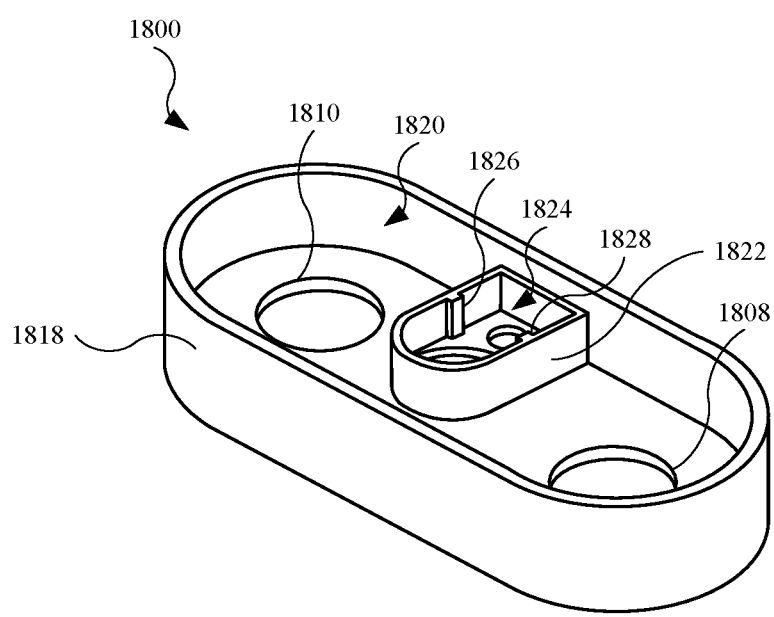
FIG. 30 illustrates an isometric view of the trim shown in FIG. 29, oriented at a different angle to show an internal region of the trim.

FIG. 30 illustrates an isometric view of the trim 1800 shown in FIG. 29, oriented at a different angle to show an internal region of the trim 1800. The trim 1800 can include a perimeter wall 1818 that defines an internal volume 1820 of the trim 1800. The perimeter wall 1818 can be used to enclose the audio and optical components of an input/output ("I/O") assembly such as the camera modules, the light emitter, and the audio transducer (not shown in FIG. 30). The trim 1800 can also include internal wall 1822 that can define an internal chamber 1824 of the trim 1800. As shown, the internal chamber 1824 may be located between the first opening 1808 and the second opening 1810. A light emitter (not shown in FIG. 30) can be positioned within the internal chamber 1824 so that the internal wall 1822 can at least partially block light emitted from the light emitter from leaking into any of the camera modules. Additionally, an audio transducer can also be positioned within the internal chamber 1824. The internal chamber can include one or more keys, such as a first key 1826 and a second key 1828, used to align the light emitter and the audio transducer.

Figure 31:
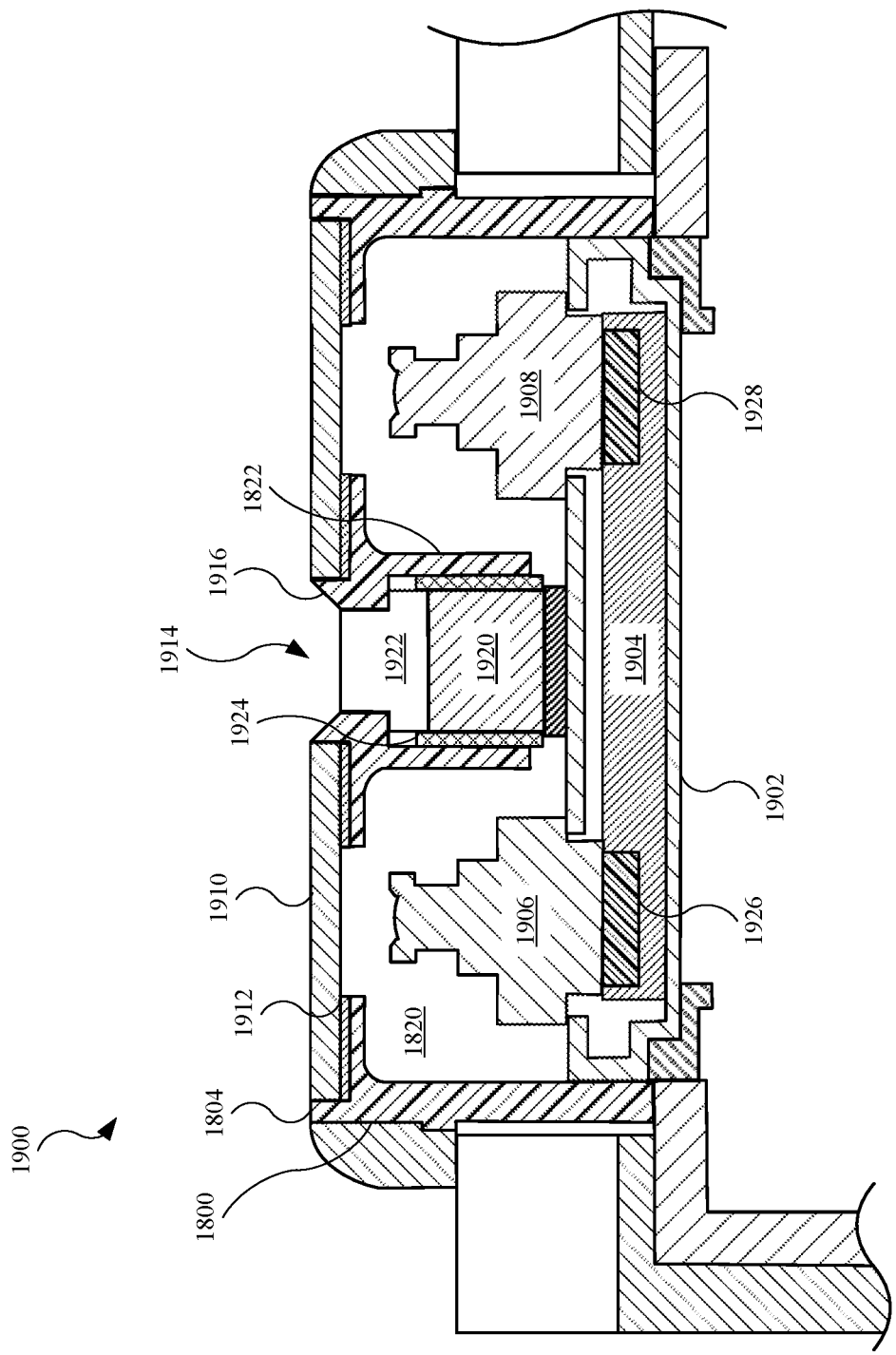
FIG. 31 illustrates a partial cross sectional view of a portion of an electronic device, showing the electronic device including the trim shown in FIGS. 29 and 30, along with multiple camera modules and a light emitter, in accordance with some described embodiments.

FIG. 31 illustrates a partial cross sectional view of a portion of an electronic device 1900, showing the electronic device 1900 including the 1800 trim shown in FIGS. 29 and 30, along with multiple camera modules and a light emitter, in accordance with some described embodiments. As shown, the electronic device 1900 may include a camera module housing 1902 that can carry a circuit board 1904 within a cavity of camera module housing 1902. The circuit board 1904 can carry, and electrically couple to, a first camera module 1906 and a second camera module 08. As shown, the first camera module 1906 and the second camera module 1908 can extend partially outside of the camera module housing 1902. The camera module housing 1902 can be enclosed in the internal volume 1820 of the trim 1800. The trim 1800 can receive a cover glass 1910. The cover glass 1910 may secure with the trim 1800 by adhesives. The first lip 1804 and the second lip 1816 can be co-planar, or flush, with respect to an exterior surface of cover glass 1910. Also, the cover glass 1910 may include an opaque layer 1912. However, the opaque layer 1912 may define a pair of openings, with one opening aligning with the first camera module 1906 and another opening aligning with the second camera module 1908 so that the camera modules can captures still and/or dynamic images.

The internal chamber 1824 (shown and labeled in FIG. 30), defined by the internal wall 1822, is designed to receive a light emitter 1920 (or strobe module) as well as a window 1922 such that the light emitter 1920 and the window 1922 are enclosed by the internal wall 1822. The light emitter 1920 and the window 1922 may align with an opening 1914 (or through hole) in the cover glass 1910. Also, the window 1922 can be positioned sub-flush with respect to the cover glass 1910 and the second lip 1816. By separating the window 1922 and the cover glass 1910, and by enclosing the window 1922 with the second lip 1816, light emitted from the light emitter 1920 can be prevented from entering the cover glass 1910, and in particular, from entering the first camera module 1906 and the second camera module 1908. As shown, the second lip 1816 can internally surround the opening 1914 the cover glass 1910. In this regard, the second lip 1816 can serve as a wall that blocks light emitted from light emitter 1920 from reaching the cover glass 1910, and directly or reflectively leaking into any of the first camera module 1906 or the second camera module 1908.

One design concern of the position of a strobe in a portable electronic device is that light may be leaked or reflected to camera by a part of the portable electronic device. Such unintended leakage or reflection deteriorates the quality of the images because, instead of being reflected by the targeted objects at the focal point, some of the light is reflected by some very nearby objects that can result in glares in the images. Such potential problem can be worsened when the portable electronic device is coupled to an external object, such as a protective case. If the potential reflection of light of the strobe is not taken into account when designing a protective case, the edges of the opening for the strobe of the protective case may reflect the light and deteriorate the quality of the images. Hence, the edge of an opening for the strobe of a case may need special design. A third party manufacturer of protective cases may not be aware of the potential problem and unintentionally design cases that could adversely affect the image quality of a camera.

However, as shown in FIG. 31, the light emitter 1920 is positioned between first camera module 1906 and second camera module 1908. This configuration may provide significant advantages over conventional placement of a strobe relative to a camera. For example, due in part to the light emitter 1920 being positioned between the first camera module 1906 and the second camera module 1908, the area surrounding the light emitter 1920 is the area that is occupied by the first camera module 1906 and the second camera module 1908. As a result, the edge of an opening of any protective case that may receive the electronic device 1900 will be relatively distant from the light emitter 1920. Hence, any potential unintentional leakage or reflection of light can be addressed by the image quality of the camera modules would not be affected by the protective case or any other accessories added to the electronic device 1900.

To further prevent leakage of light from the light emitter 1920 to any of the camera modules, particularly against internal leakage, a sealing member 1924 can engage the light emitter 1920. The sealing member 1924 can be a ring shaped structure (hence, shown as two portions in the cross-section view of FIG. 31) that engages with the perimeter of light emitter 1920. The sealing member 1924 can be a compression-molded piece that can be formed from an elastic and opaque material(s). The sealing member 1924 can serve multiple purposes. First, the sealing member 1924 can fill the remaining space of the internal chamber 1824 (defined by the internal wall 1822) so that the light emitter 1920 can be isolated from the first camera module 1906 and the second camera module 1908, thereby preventing the first camera module 1906 and the second camera module from directly receiving light from the light emitter 1920. Second, the sealing member 1924 can also force the light emitter 1920 and the window 1922 against the trim 1800 so that the light emitter 1920 and the window 1922 are secured in placed. Third, based on the position of the sealing member 1924, light emitted from the light emitter 1920 is prevented from reaching a first light sensor 1926 and second light sensor 1928, both of which are on the circuit board 1904.

Figure 32:
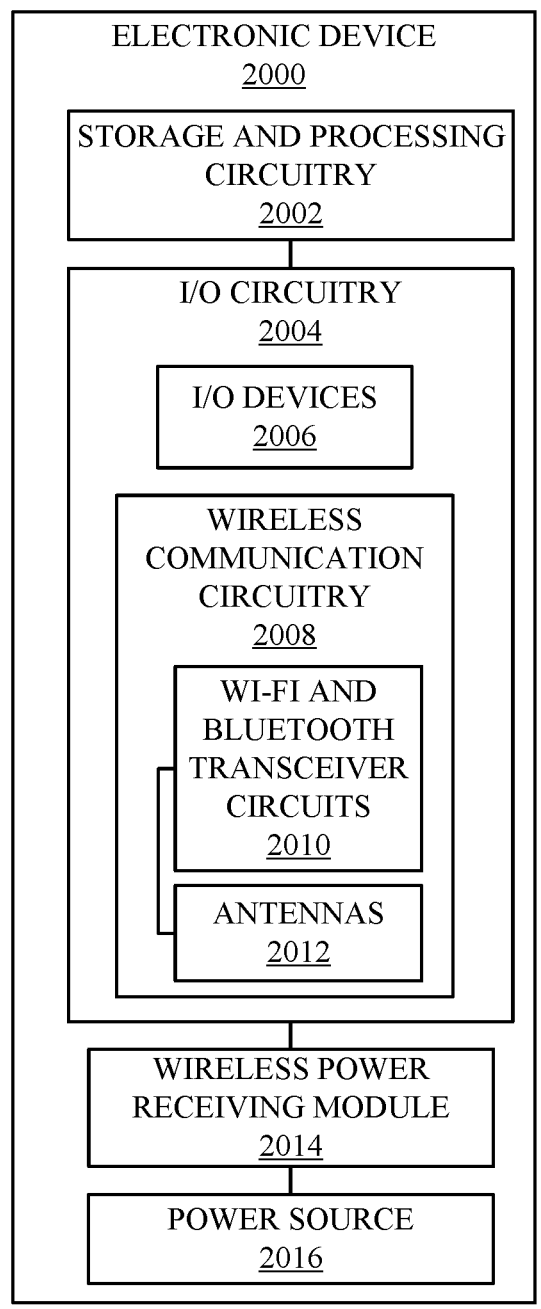
FIG. 32 illustrates a schematic diagram of an electronic device, in accordance with some described embodiments.

FIG. 32 illustrates a schematic diagram of an electronic device 2000, in accordance with some described embodiments. The electronic device 2000 may embody any electronic device described herein. The electronic device 2000 may include storage and processing circuitry 2002 that includes hard disk storage, nonvolatile memory (such as flash memory or another electrically programmable read-only memory) or volatile memory. The storage and processing circuitry 2002 may further include a processor, such as a microprocessor or other integrated circuit, used to process a program(s) or algorithm(s) stored on the storage circuitry. The storage and processing circuitry 2002 may be used to carry communication protocols for wireless communication, which may include IEEE 802.11 protocols (Wi-Fi) or Bluetooth® protocol, as examples.

The electronic device 2000 may further include I/O circuitry 2004, or input-output circuitry, used to send data and receive data. The I/O circuitry 2004 may include a circuit board assembly described herein. The electronic device 2000 may include I/O devices 2006, which may include inputs such a touch sensitive layer and force sensitive layer in a display assembly, buttons, switches, microphones, cameras and light receiving modules for a vision system, cameras (including a dual camera assembly separate from the vision system). The outputs may include audio modules, light emitting modules for the vision system, and a display layer. The electronic device 2000 may include I/O circuitry 2004 to support the I/O devices 2006.

The electronic device 2000 may further include wireless communication circuitry 2008. The wireless communication circuitry 2008 can include Wi-Fi and Bluetooth® circuits 2010 and related radio frequency (RF) components for handling RF wireless signals. The wireless communication circuitry 2008 may further include antennas 2012, which may include a single band, or alternatively a dual-band antenna, that can cover Wi-Fi bands, such as 2.4 Gigahertz ("GHz") and 5 GHz, and Bluetooth® bands (2.4 GHz).

The electronic device 2000 may further include a wireless power receiving module 2014. The wireless power receiving module 2014 may receive an induced current when exposed to magnetic flux. The induced current may be used to recharge a battery assembly in the electronic device 2000.

The electronic device 2000 may include a power source 2016 that stores energy that can be converted to electrical energy to supply current to the wireless power receiving module 2014. In this manner, the I/O circuitry 2004 may include a power converter that converts alternating current ("AC") to direct current ("DC").

In a first exemplary embodiment, an electronic device may include sidewall components that combine to form a band. The first exemplary embodiment may further include a bottom wall coupled with the band to define an internal volume. The first exemplary embodiment may further include a transparent protective cover coupled with the band. The protective cover may include edges that define an outer perimeter. The first exemplary embodiment may further include a display assembly coupled with the protective cover and at least partially positioned in the internal volume. The first exemplary embodiment may further include a border positioned between the transparent protective cover and the display assembly. The border may include a uniform dimension in at least two dimensions. In some instances, the display assembly is capable of presenting visual information, and in some instances, at least some of the visual information is visible at the edges.

Further, in the first exemplary embodiment, in some instances, the edges include four edges, and in some instances at least some of the visual information is visible at the four edges. Also, the first exemplary embodiment may further include a vision system capable of facial recognition. The first exemplary embodiment may further include a bracket assembly that holds the vision system. In some instances, the bracket assembly may lack an affixation with the band and the bottom wall. Also, the first exemplary embodiment may further include a masking layer formed from an opaque material that at least partially covers the vision system. The masking layer may include openings. The first exemplary embodiment may further include an alignment module coupled with the transparent protective cover. In some instances, the alignment module aligns the vision system with the openings. The battery assembly of the first exemplary embodiment may further include a first battery component, and a second battery component coupled to the first battery component by a coupling member. In some instances, the first battery component and the second battery component are capable of generating energy for at least some component located in the internal volume. The first exemplary embodiment may further include a wireless power receiving module capable of receiving an induced current used to provide energy to the battery assembly, a circuit board assembly that includes a first circuit board stacked over a second circuit board. In some instances, the first circuit board includes a first mounting surface that carries a first integrated circuit, and the second circuit board includes a second mounting surface that faces the first mounting surface, the second mounting surface carrying a second integrated circuit that is in electrical communication with the first integrated circuit. Also, in some instances, each of the battery assembly and the circuit board assembly resembles an L-shape.

In a second exemplary embodiment, an electronic device may include sidewall components that combine to form a band. The second exemplary embodiment may further include a bottom wall coupled with the band to define an internal volume. The second exemplary embodiment may further include a bracket assembly that carries a vision system. The bracket assembly and the vision system are positioned in the internal volume. The second exemplary embodiment may further include a protective cover coupled with the band. The protective cover may include an alignment module capable of engaging the vision system and causing movement of the vision system and the bracket assembly relative to the bottom wall.

The second exemplary embodiment may further include a masking layer positioned against the transparent cover and at least partially covering the vision system. The masking layer may include a first opening and a second opening. In some instances, the vision system including a light emitting module aligned with the first opening and light receiving module aligned with the second opening. In some instances, the light emitting module emits infrared light onto an object, and in some instances, the light receiving module receives at least some of the infrared light reflected from the object. Also, in some instances, the first opening is covered by a first filter, the second opening is covered by a second filter, and the first filter and the second filter block light other than the infrared light. The second exemplary embodiment may further include a battery assembly positioned in the internal volume. The battery assembly may include a first battery component, and a second battery component coupled to the first battery component by a coupling member, wherein the first battery component and the second battery component are capable of generating energy for at least some component located in the internal volume. In some instances, the first battery component and the second battery component combine to resemble an L-shape. The second exemplary embodiment may further include a wireless power receiving module capable of receiving an induced current used to provide energy to the battery assembly. In some instances, the bottom wall includes a non-metal that permits passage of an electromagnetic field.

In a third exemplary embodiment, an electronic device may include an enclosure that defines an internal volume. The third exemplary embodiment may further include a processor circuit disposed in the internal volume. The third exemplary embodiment may further include a bracket assembly disposed in the internal volume and lacking an affixation with the enclosure such that the bracket assembly is movable with respect to the enclosure. The third exemplary embodiment may further include a vision system carried by the bracket assembly. The vision system is capable of providing facial recognition information to the processor circuit.

The third exemplary embodiment may further include a display assembly that includes a notch. In some instances, the vision system remains uncovered by the display assembly based on the notch. The third exemplary embodiment may further include a transparent protective cover that overlays the display assembly. In some instances, the display assembly presents information visible at an outer perimeter of the transparent protective cover. The enclosure of the third exemplary embodiment may include sidewall components formed from a metal. The enclosure of the third exemplary embodiment may further include a bottom wall coupled with the sidewall components. The bottom wall may include a non-metal material that includes an opening. The enclosure of the third exemplary embodiment may further include a camera assembly that includes a first camera module, a second camera, and a strobe module aligned with the opening. In some instances, the sidewall components include a first sidewall component and a second sidewall component. The first sidewall component may include a first sidewall opening that receives a first control input, the second sidewall component may include a second sidewall opening that receives a first control input, and the camera assembly is parallel with respect to the first control input and the second control input.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. An electronic device, comprising:
  a housing having a band coupled with a first transparent protective cover and a second transparent protective cover, the band combining with the first transparent protective cover and the second transparent protective cover to form an internal volume;
  a bracket assembly positioned in the internal volume and lacking an affixation with the housing, the bracket assembly carrying a vision system that provides facial recognition information;
  an alignment module coupled with the first transparent protective cover, wherein a position of the vision system is adjusted when the vision system contacts the alignment module, the alignment module comprising a rail that aligns the vision system;
  a display assembly coupled with the first protective cover, the display assembly comprising a notch in a location corresponding to the vision system;
  a battery located in the internal volume; and
  a wireless power receiving module, wherein the battery is inductively charged from the wireless power received module.

2. The electronic device of claim 1, wherein the vision system comprises:
  a first camera module capable of capturing an image of an object external to the housing;
  a light emitting module capable of emitting light defining a dot pattern that is projected onto the object; and
  a second camera module capable of capturing at least a portion of the dot pattern that is reflected from the object.

3. The electronic device of claim 1, wherein the bracket assembly comprises a spring element that provides a force in a direction away from the second transparent protective cover.

4. The electronic device of claim 3, wherein the alignment module and the spring element retain bracket assembly in the internal volume.

5. The electronic device of claim 1, further comprising:
  an ambient light sensor;
  a light emitter; and
  a microphone, wherein the alignment module aligns the ambient light sensor, the light emitter and the microphone.

6. The electronic device of claim 5, further comprising an audio module that defines a speaker, the speaker positioned in an opening of the alignment module.

7. The electronic device of claim 1, further comprising a border that covers an outer edge of the display assembly, the border having a uniform thickness in a plane that is parallel with respect to the first protective cover.

8. The electronic device of claim 1, wherein the band comprises a metal band that forms sidewall components.

* * * * *